US009346077B2

(12) United States Patent
Lambertson, Jr. et al.

(10) Patent No.: US 9,346,077 B2
(45) Date of Patent: May 24, 2016

(54) QUICK FIT ADJUSTMENT MECHANISM FOR EXTENSION POLE SYSTEM FOR PAINT ROLLER

(71) Applicant: The Sherwin-Williams Company, Cleveland, OH (US)

(72) Inventors: Michael C. Lambertson, Jr., Aurora, OH (US); Rita Forman-House, Avon Lake, OH (US); Dennis P. De Renzo, Jr., Concord Township, OH (US); Michael O'Banion, West Minister, MD (US); Edward Ray Goodwin, Jr., Westlake, OH (US)

(73) Assignee: The Sherwin-Williams Company, Cleveland, OH (US)

(*) Notice: Subject to any disclaimer, the term of this patent is extended or adjusted under 35 U.S.C. 154(b) by 0 days.

(21) Appl. No.: 14/268,572

(22) Filed: May 2, 2014

(65) Prior Publication Data
US 2014/0270925 A1    Sep. 18, 2014

Related U.S. Application Data

(63) Continuation-in-part of application No. 13/840,852, filed on Mar. 15, 2013, now Pat. No. 9,127,699.

(51) Int. Cl.
*F16B 7/04* (2006.01)
*B05C 17/02* (2006.01)
*B05B 15/06* (2006.01)

(52) U.S. Cl.
CPC .............. *B05C 17/0205* (2013.01); *B05B 15/06* (2013.01); *F16B 7/0413* (2013.01); *Y10T 29/49826* (2015.01); *Y10T 403/56* (2015.01)

(58) Field of Classification Search
CPC ........ F16B 7/0406; F16B 7/042; B23P 11/00; B25G 3/30; Y10T 29/49948; Y10T 29/49826; Y10T 403/56
USPC ........... 403/322.1, 322.2, 322.3, 322; 15/145, 15/143.1
See application file for complete search history.

(56) References Cited

U.S. PATENT DOCUMENTS

| 3,049,367 | A | | 8/1962 | Lashta |
| 4,247,216 | A | | 1/1981 | Pansini |
| 4,865,485 | A | * | 9/1989 | Finnefrock, Sr. ... B25B 23/0021 403/17 |
| 5,226,198 | A | | 7/1993 | Martin |
| 5,288,161 | A | * | 2/1994 | Graves ................ B05C 17/0205 15/145 |

(Continued)

FOREIGN PATENT DOCUMENTS

| DE | 804680 | 4/1951 |
| DE | 202011106800 | 11/2011 |

OTHER PUBLICATIONS

International Search Report for International Patent Application No. PCT/US2014/025465 mailed Jun. 25, 2014.

(Continued)

*Primary Examiner* — Jason L Vaughan
(74) *Attorney, Agent, or Firm* — Daniel A. Sherwin, Esq.; Roger D. Emerson, Esq.; Emerson Thomson Bennett, LLC

(57) ABSTRACT

A quick fit adjustment mechanism may include a housing having one end that attaches to a pole and another end that attaches to an insert mounted to a paint accessory. A lever may be used to cause an actuator pin to extend from the housing into the insert to secure the housing to the insert and thus to secure the paint accessory to the pole.

20 Claims, 20 Drawing Sheets

(56) References Cited

U.S. PATENT DOCUMENTS

| | | | |
|---|---|---|---|
| 5,471,701 A * | 12/1995 | Parfenie | A46B 7/04 |
| | | | 15/145 |
| 5,842,810 A | 12/1998 | Morad | |
| 5,911,258 A * | 6/1999 | Morad | A47L 13/52 |
| | | | 15/145 |
| 5,933,966 A | 8/1999 | Yates et al. | |
| 5,992,423 A | 11/1999 | Tevolini | |
| 6,199,457 B1 * | 3/2001 | Hoff | B25B 23/0021 |
| | | | 403/325 |
| 6,502,585 B1 * | 1/2003 | Mazzei | A46B 7/04 |
| | | | 132/237 |
| 6,874,201 B2 | 4/2005 | Ta et al. | |
| 7,013,766 B2 * | 3/2006 | Lee | B25B 23/0021 |
| | | | 403/325 |
| 7,140,277 B1 * | 11/2006 | Chern | B25B 23/0021 |
| | | | 403/324 |
| 7,555,805 B2 | 7/2009 | Lin | |
| 8,769,764 B2 * | 7/2014 | Crouch | A47L 9/2847 |
| | | | 15/246.2 |
| 8,869,807 B2 | 10/2014 | Olson | |
| 2007/0017072 A1 * | 1/2007 | Serio | A47L 13/42 |
| | | | 24/573.11 |
| 2008/0052852 A1 | 3/2008 | Lin | |
| 2010/0147117 A1 * | 6/2010 | Hsieh | B25B 23/0021 |
| | | | 81/177.85 |

OTHER PUBLICATIONS

International Preliminary Report on Patentability for International Patent Application No. PCT/US2014/025465 completed Feb. 19, 2015.

Written Opinion for International Patent Application No. PCT/US2014/025465 mailed Jun. 25, 2014.

* cited by examiner

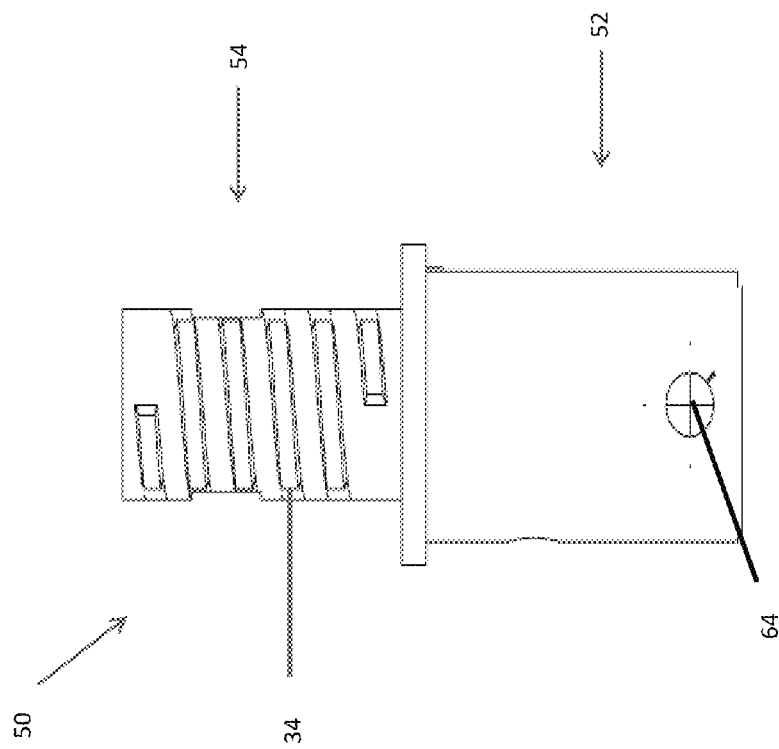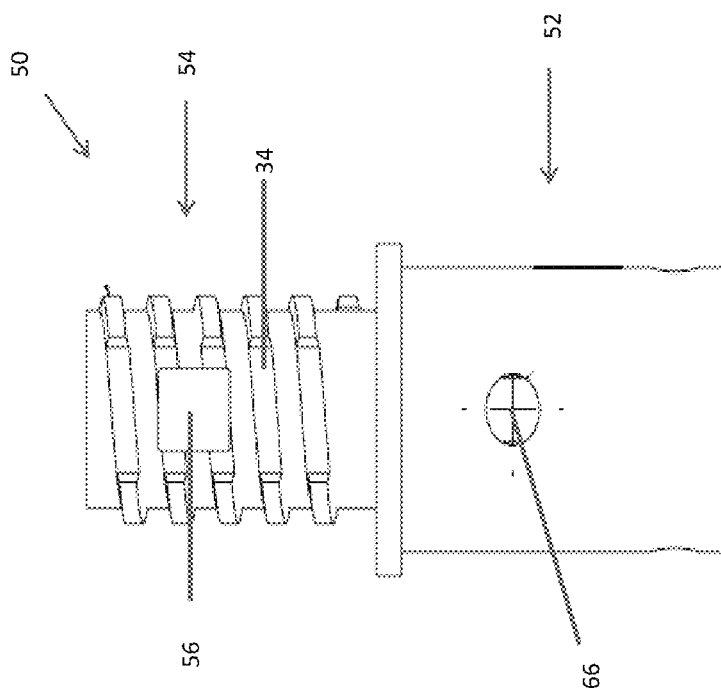

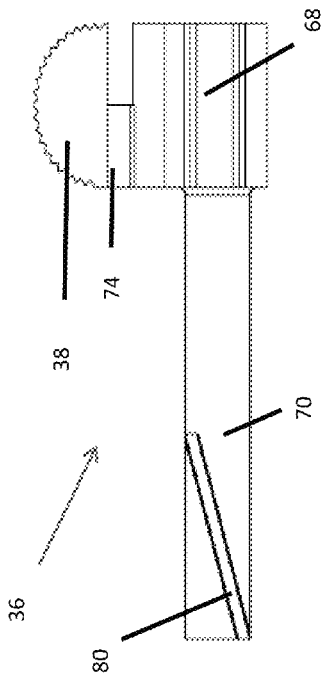
Fig. 10
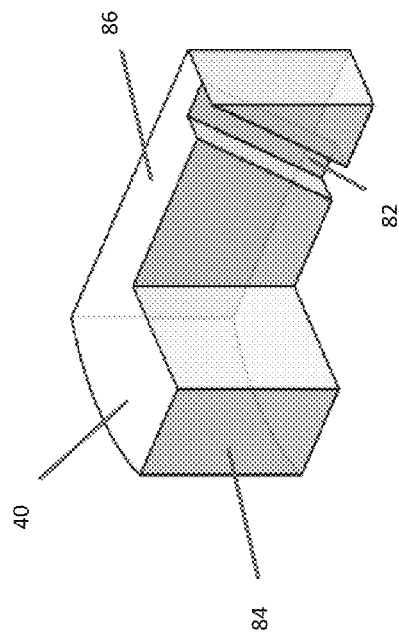
Fig. 11
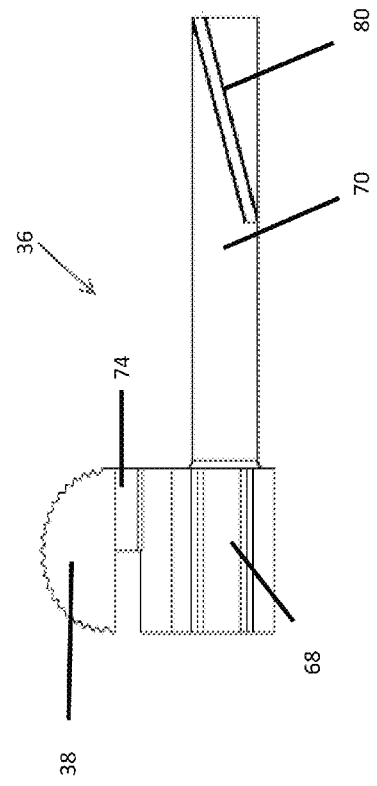
Fig. 12
Fig. 13

QUICK FIT ADJUSTMENT MECHANISM FOR EXTENSION POLE SYSTEM FOR PAINT ROLLER

This application is a continuation-in-part of U.S. patent application Ser. No. 13/840,852 filed Mar. 15, 2013, entitled "QUICK FIT ADJUSTMENT MECHANISM FOR EXTENSION POLE SYSTEM FOR PAINT ROLLER."

I. BACKGROUND

A. Field of the Invention

This invention is in the field of methods and apparatuses for connecting paint related accessories to poles and more specifically to methods and apparatuses for a quick fit adjustment mechanism that easily connects a pole to various types of paint related accessories.

B. Description of Related Art

It is well known in the paint industry to provide poles, which typically are used as a handle by a user, that are designed to connect to and disconnect from specific paint accessories. It is known, for example, to provide a pole that has a threaded distal end that engages threads formed within an opening on a paint roller handle/pole. It is also know, as another example, to provide a pole with an opening, having slots, that receives a paint roller pole/handle having extensions that match the shape and size of the slots.

While many known connect/disconnect mechanisms used in the paint industry work well for their intended purposes, they have a disadvantage. The disadvantage is that a given pole/handle will only connect to a limited number of paint accessories. If a user has a pole and a paint accessory that does not "match" the pole, the user has no option but to purchase a new pole to match the paint accessory or a new paint accessory to match the pole. This adds undesirable cost and undesirable time to painting projects.

What is needed is a quick fit adjustment mechanism that is designed to enable a pole to engage with many different types, sizes, and styles of paint accessories.

II. SUMMARY

According to one embodiment of this invention, a quick fit adjustment mechanism may comprise: a housing comprising: (1) a first end that has a surface that is suitable to be attached to an associated pole; (2) a second end that has an outer surface with threads that are engageable with threads formed on a surface defining a first accessory opening in a first associated accessory to secure the first associated accessory to the associated pole; (3) a housing chamber formed within the housing and extending from the first end to the second end; and, (4) a housing hole that communicates the housing chamber to the outer surface of the second end of the housing; and, a lever that: (1) is positioned at least partially within the housing chamber; (2) has a first end defining an actuator pin that is positioned juxtaposed to the housing hole; (3) comprises an operator engagement surface; and, (4) is pivotal with respect to the housing. The quick fit adjustment mechanism may be adjustable by selective manual engagement with the operator engagement surface to pivot the lever with respect to the housing between: (1) a first condition where the actuator pin is in a refracted position with respect to the housing hole and the second end of the housing is: (a) removable from the first accessory opening; and, (b) insertable within a second accessory opening in a second associated accessory; and, (2) a second condition where, while the second end of the housing is inserted within the second accessory opening, the actuator pin is in an extended position where the actuator pin extends from the housing chamber out of the housing hole and into engagement with the second associated accessory to secure the second associated accessory to the associated pole.

According to one embodiment of this invention, a paint assembly may comprise: a pole; a paint accessory comprising: an accessory opening; and, a quick fit adjustment mechanism. The quick fit adjustment mechanism may comprise: an insert comprising: (1) an insert body, wherein at least a portion of the insert body is positioned within the accessory opening to attach the insert to the paint accessory; (2) an insert chamber that extends into the insert body; and, (3) an insert hole that communicates with the insert chamber; a housing comprising: (1) a first end that has a surface that is attached to the pole; (2) a second end; (3) a housing chamber formed within the housing and extending from the first end to the second end; and, (4) a housing hole that communicates the housing chamber to the outer surface of the second end of the housing; and, a lever that: (1) is positioned at least partially within the housing chamber; (2) has a first end defining an actuator pin that is positioned juxtaposed to the housing hole; (3) comprises an operator engagement surface; and, (4) is pivotal with respect to the housing. The lever may be adjustable by selective manual engagement with the operator engagement surface to pivot the lever with respect to the housing between: (1) a first condition where the actuator pin is in a retracted position with respect to the housing hole and the second end of the housing is insertable into the insert chamber and thus into the accessory opening; and, (2) a second condition where, while the second end of the housing is inserted within the insert chamber, the actuator pin extends from the chamber out of the housing hole and into the insert hole to secure the paint accessory to the pole.

According to yet another embodiment of this invention, a method may comprise the steps of: (A) providing a pole; (B) providing a first paint accessory comprising: a first accessory opening; (C) providing a quick fit adjustment mechanism comprising: a housing comprising: (1) a first end that is attached to an end of the pole; (2) a second end that is sized to be received in the first accessory opening; (3) a housing chamber formed within the housing and extending from the first end to the second end; and, (4) a housing hole that communicates the housing chamber to the outer surface of the second end of the housing; and, a lever that: (1) is positioned at least partially within the housing chamber; (2) has a first end defining an actuator pin that is positioned juxtaposed to the housing hole; (3) comprises an operator engagement surface; and, (4) is pivotal with respect to the housing; and, (D) attaching the quick fit adjustment mechanism, and thus the pole, to the first paint accessory by: (1) manually engaging the operator engagement surface of the lever to pivot the lever with respect to the housing to cause the actuator pin to move into a retracted position with respect to the housing hole; (2) inserting the second end of the housing into the first accessory opening; and, (3) manually engaging the operator engagement surface of the lever to pivot the lever with respect to the housing to cause the actuator pin to move into an extended position where the actuator pin extends through the housing hole and into engagement with the first accessory to secure the first paint accessory to the housing and thus to the pole.

Benefits and advantages of this invention will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 7 is a first side view of the housing.

FIG. 8 is a second side view of the housing.

FIG. 10 is a first side view of the lever.

FIG. 11 is a second side view of the lever.

FIG. 12 is an end view of the lever.

FIG. 13 is a perspective view of an actuator pin.

IV. DETAILED DESCRIPTION

Figure 1:
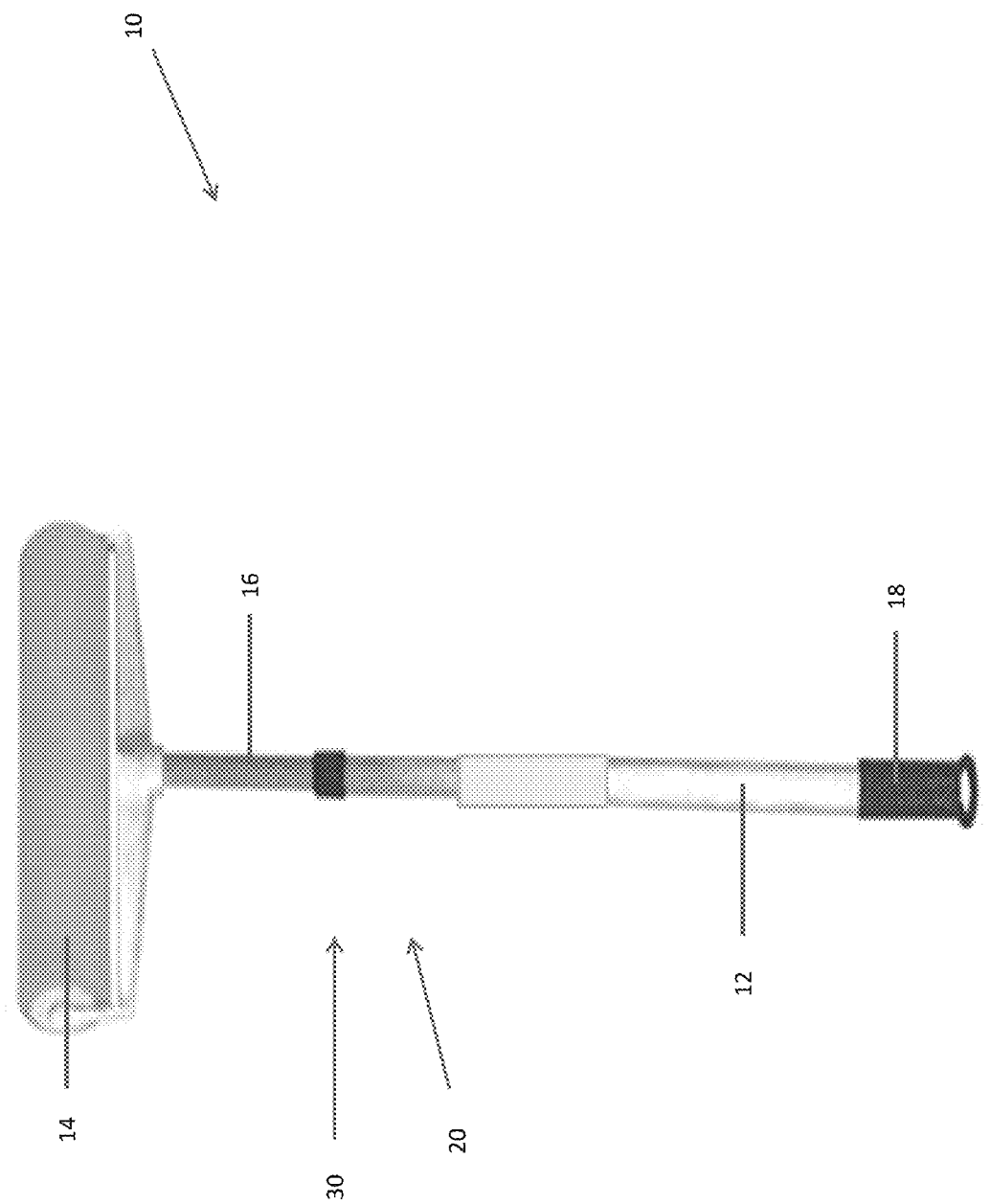
FIG. 1 is a side perspective view of a paint roller assembly that may use a quick fit adjustment mechanism according to some embodiments of this invention.

Referring now to the drawings wherein the showings are for purposes of illustrating embodiments of the invention only and not for purposes of limiting the same, and wherein like reference numerals are understood to refer to like components, FIG. 1 shows an assembly 10 that may use embodiments of a quick fit adjustment mechanism 30 of this invention. The assembly 10 may include a pole 12 that is attached to an accessory 14. The accessory shown is a paint accessory; and more specifically a paint roller. The pole 12 may be used as a handle and thus may include a grip surface 18. The accessory 14 may have a portion 16 to which the pole 12 is connected. In one embodiment, shown, the paint accessory portion 16 is a pole. The quick fit adjustment mechanism 30 may be used to quickly and easily connect the pole 12 to the accessory 14 and to quickly and easily disconnect the pole 12 from the accessory 14. While the quick fit adjustment mechanism 30 is ideally suited for use with paint accessories, including rollers and the like, it is not limited to that application as the quick fit adjustment mechanism 30 may find application to connect and disconnect poles to other accessories and other poles when used with the sound judgment of a person of skill in the art.

The pole 12 may have a distal end 20 and the accessory 14 may have an opening 32. The paint accessory portion 16 may have various designs within the opening 32 and the quick fit adjustment mechanism 30 of this invention is designed to accommodate numerous such designs, making the quick fit adjustment mechanism 30 a nearly universal attachment mechanism.

Figure 6:
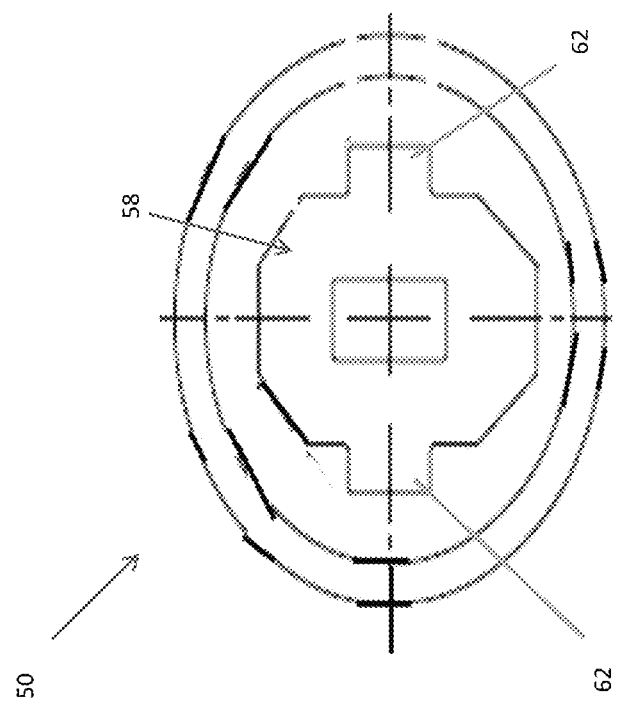
FIG. 6 is an end view of the first end of the housing.
Figure 5:
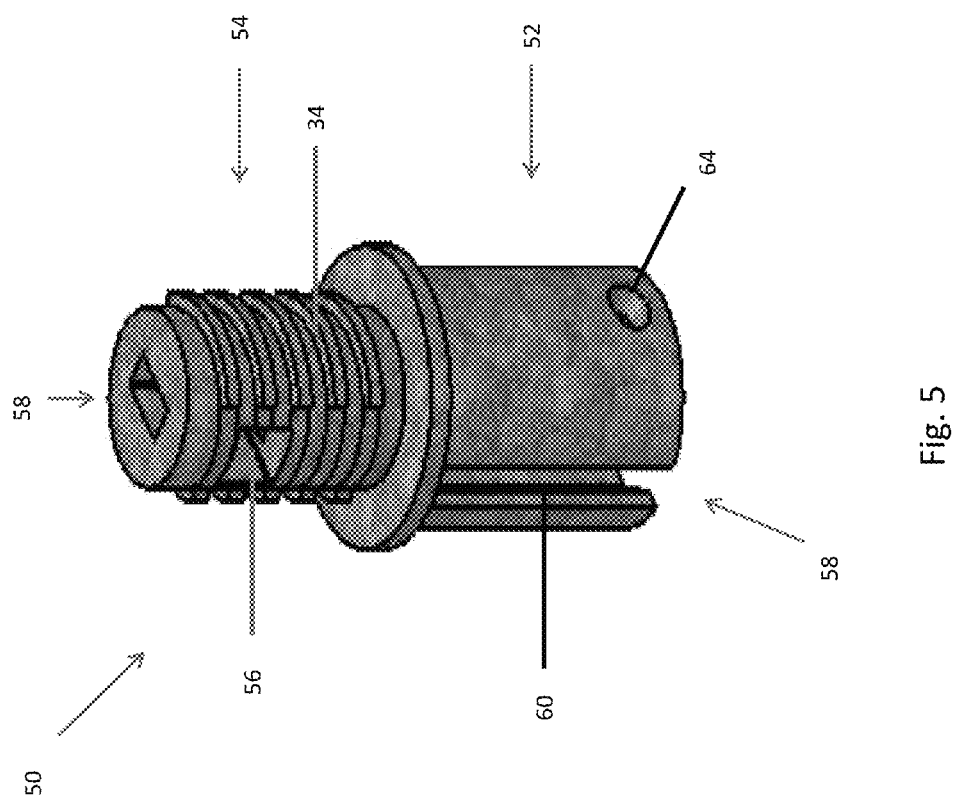
FIG. 5 is a perspective view of a housing.
Figure 9:
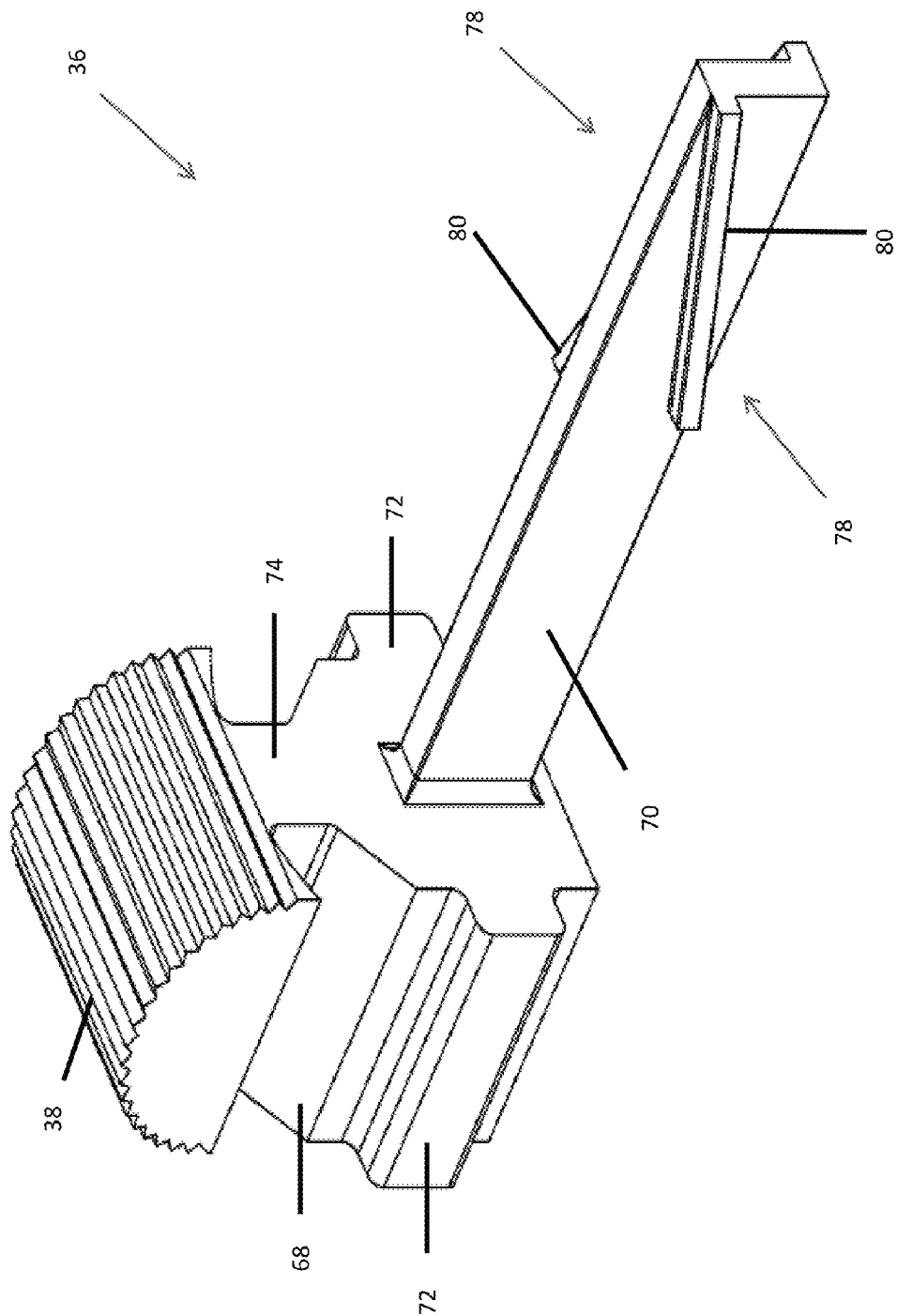
FIG. 9 is a perspective view of a lever.

The quick fit adjustment mechanism 30 may include a housing 50, one or more actuator pins 40, and a lever 36. The housing 50 may have a first end 52 that is attachable to the distal end 20 of the pole 12 and a second end 54 having an outer surface with threads 34. The housing may have holes 56 through which the actuator pins 40 may be extended and retracted. A chamber 58 may be formed in each end of the housing 50 and they may communicate with each other. The chamber 58 in the second end 54 may communicate with the holes 56. The chamber 58 in the first end 52 may have a slot 60 that may extend through the outer surface of the housing 50, as shown. The chamber 58 in the first end 52 may also have at least one channel 62, two shown in FIG. 6, that are formed on a side of the chamber 58. The first end 52 may also have an aperture 66. One or more connection sites 64 which may be used to attach the first end 52 to the pole 12, may be provided.

Figure 16:
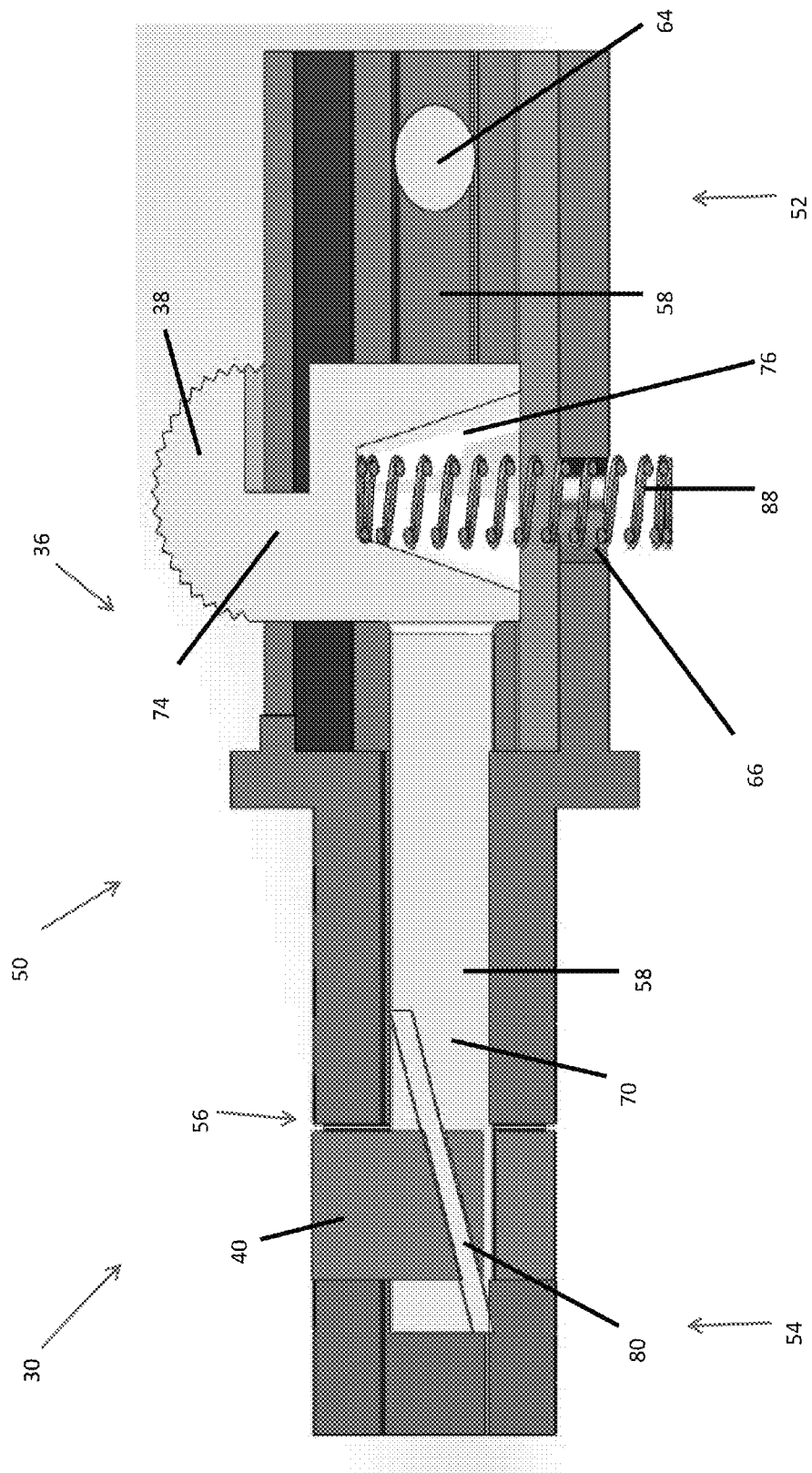
FIG. 16 is a side sectional view of the quick fit adjustment mechanism.

The lever 36 may be supported to the housing 50 and moveable with respect to the housing 50 as will be discussed further below. The lever 36 may have a main body 68 and a plate 70 that extends from the main body 68, as shown. The main body 68 may have at least one rib 72, two shown, that is received in the channel 62 formed in the housing 50 and by which the lever 36 is slidable within and with respect to the housing 50. When the lever 36 is positioned within the housing 50, the plate 70 may extend into the chamber 58 for in the second end 54 of the housing 50. The lever 36 may have a neck 74 that extends from the main body 68 and through the slot 60 in the housing 50. An operator button 38 may be attached to the distal end of the neck 74, as shown. A grip surface 48 may be positioned on the outer surface of the operator button 38 to improve the grip between the user and the operator button 38. The operator button 38 shown is adjustable longitudinally, in the directions indicated by arrow 42. In another embodiment, the button 38 may move laterally, and in yet another embodiment the button may be adjusted by rotational movement. The lever may have an aperture 76, shown in FIG. 16, used as discussed below. The aperture 76 may be cone-shaped, as shown.

The lever 36 may have at least one contact surface 78, two shown, that contacts a corresponding actuator pin 40. In one embodiment, the contact surfaces 78 are on opposite sides of the plate 70. Each contact surface 78 may comprise a ridge 80 that may be angled with respect to a longitudinal center line of the lever when the quick fit adjustment mechanism is attached to the pole. The ridges 80 may be angled in opposite directions, as shown. Each actuator pin 40, see especially FIG. 13, may have a groove 82 that receives the corresponding ridge 80. Each actuator pin 40 may be L-shaped, as shown, having a first leg 84 that may define the distal end, the first to extend out of the hole 56, and a second leg 86 that may have the groove 82. The groove 82 may be angled, as shown, and cooperate with the corresponding ridge 80 to cause the actuator pins 40 to move as will be discussed below.

A biasing device 88 may be used to maintain position of the lever 36 with respect to the housing 50. The biasing device 88 may be a spring that extends through the aperture 66 in the first end of the housing 50 and into the aperture 76 in the lever 36, as shown. In one embodiment, the pole has a cavity into which the first end 52 of the housing 50 is inserted. In this case, the biasing device 88 has a first end that contacts an inner surface of the pole defining the cavity and a second end that is received within the aperture in the lever 36.

In one design, the paint accessory portion 16 may have threads formed on the surface of the opening 32. To accommodate this design, the pins 40 may be retracted, as discussed below. The threads 34 on the housing 50 may then engage the threads on the accessory 14 to secure the accessory 14 to the pole 12. More specifically, the pole 12 may be rotated with respect to the accessory 14 while allowing the threads 34 on pole 12 to engage the threads formed on the surface of the opening 32. The pole 12 can be easily disconnected from the accessory portion 16 by rotating the pole 12 with respect to the paint accessory portion 16 in the opposite direction.

Figure 15:
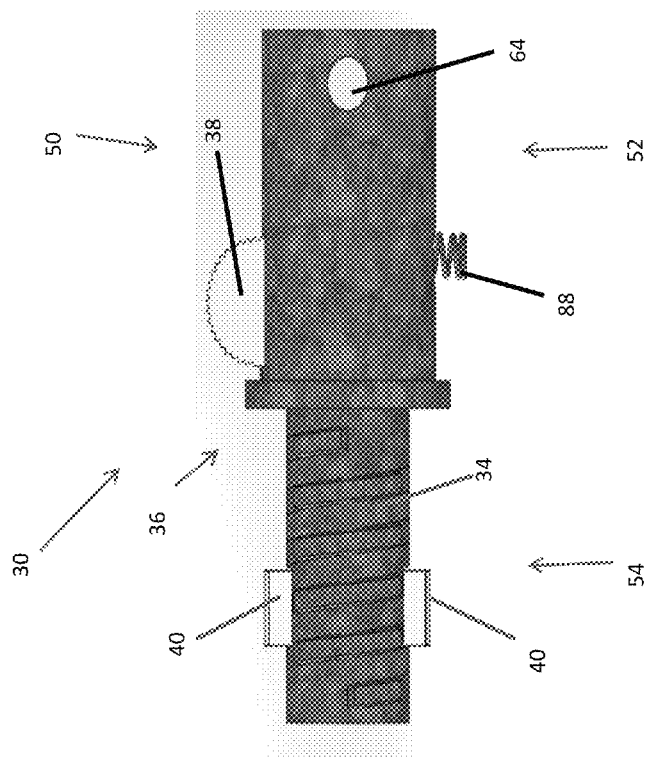
FIG. 15 is a side view of the quick fit adjustment mechanism in an extended position.
Figure 14:
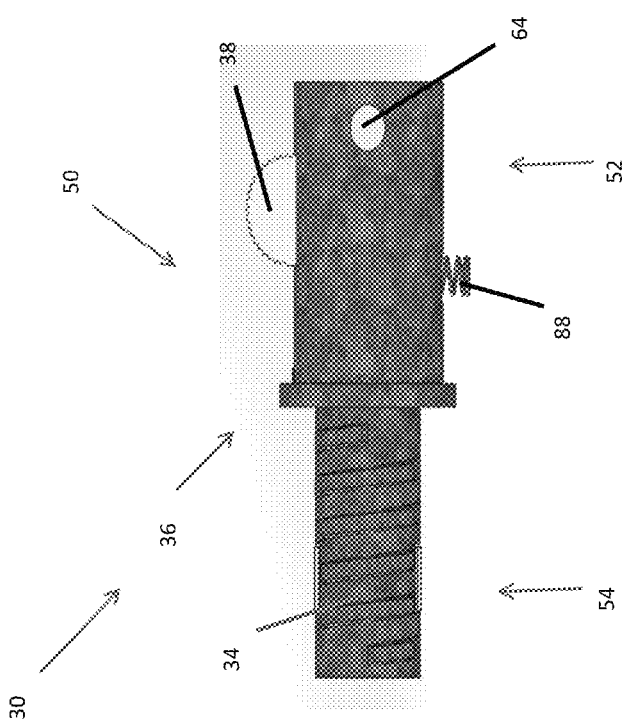
FIG. 14 is a side view of the quick fit adjustment mechanism in a retracted position.

In another design, the paint accessory portion 16 is not able to engage the threads 34. In this case, the quick fit adjustment mechanism 30 may be adjusted by moving the operator button 38, see arrow 42, to move the lever 36 with respect to the housing 50 between: (1) a first position, see FIGS. 3 and 14, where the first and second actuator pins are in a retracted position with respect to the first and second holes in the housing; and, the second end of the housing is insertable within an opening in a second associated accessory; and, (2) a second position, see FIGS. 2 and 15, where the first and second actuator pins extend out of the first and second holes and are contactable to an inner surface of the opening in the accessory to secure the accessory to the pole. To then remove the pole 12, it is only necessary to move the operator button, and thus the lever, in the opposite direction. This causes the actuator pins to retract and the pole can then be easily removed.

The actuator pins 40 shown are on opposite sides of the housing, top and bottom surfaces in a specific embodiment, but other positions may work equally well, depending on the shape of the opening 32. The pins 40 may extend from the outer surface of the pole 12 in locations where the threads 34 are not located, as shown. In another embodiment, the pins 40 may extend from the outer surface of the pole 12 in locations where the threads 34 are located. The quick fit adjustment mechanism 30 may include a sleeve 44 that covers a portion of the outer surface of the pole 12, as shown. The sleeve 44 may serve to provide a grip surface for the user and/or may serve to cover/protect the components that engage the operator button 38. In one embodiment, shown, the button 38 is positioned substantially outside of the sleeve 44.

Figure 2:
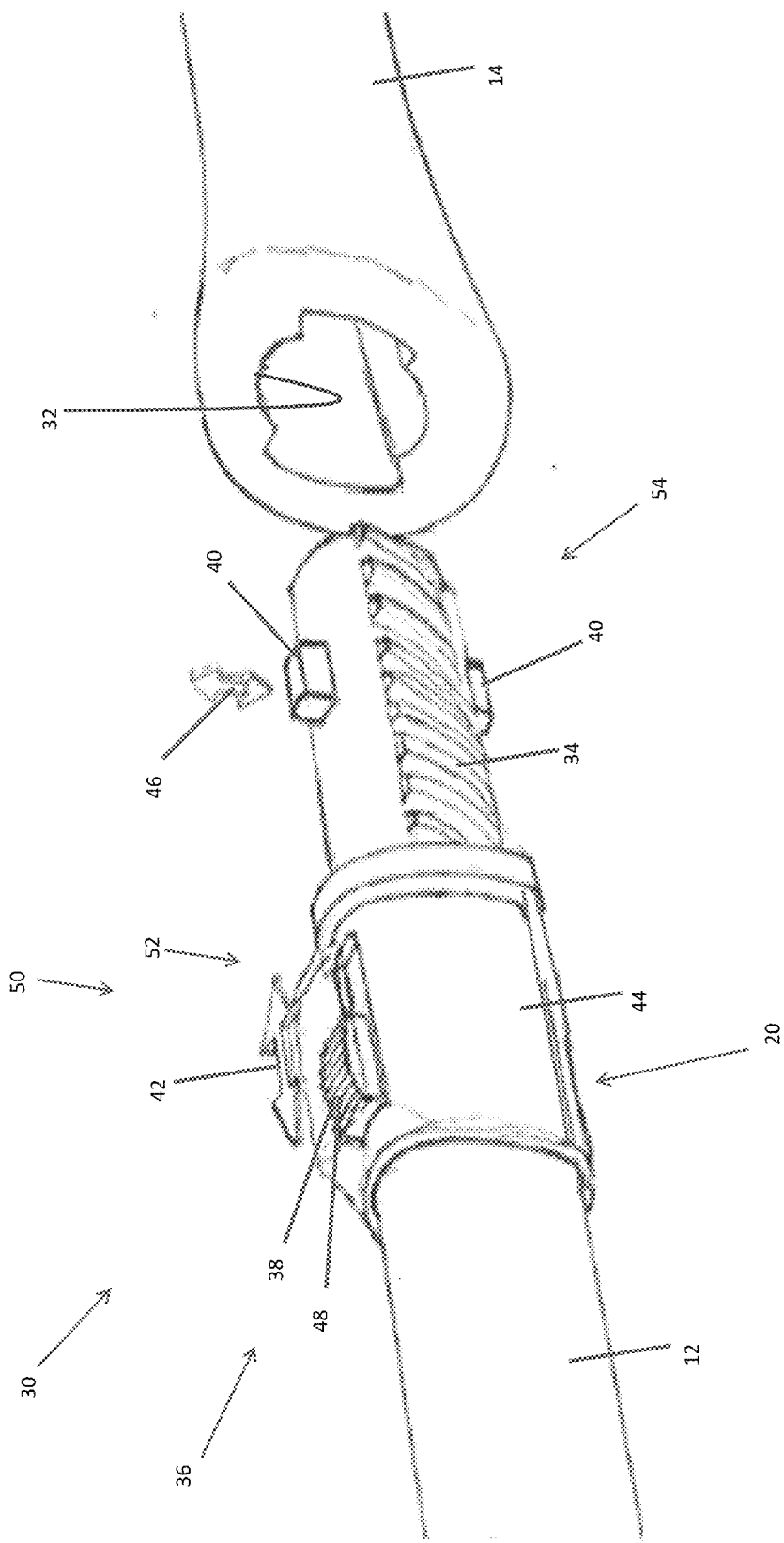
FIG. 2 is a perspective close-up view of a quick fit adjustment mechanism in a first position where actuator pins are extended.
Figure 3:
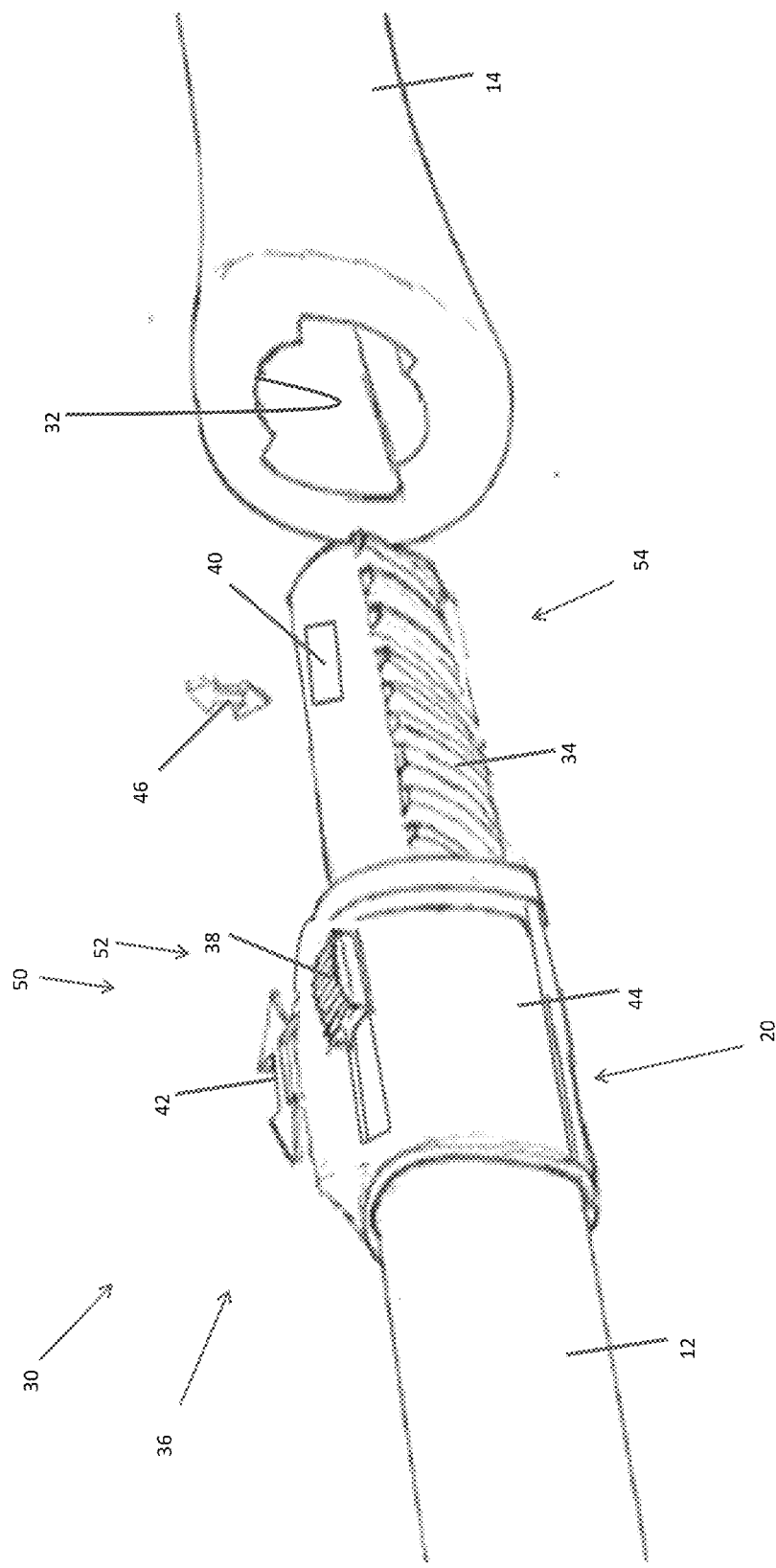
FIG. 3 is a perspective close-up view similar to that shown in FIG. 2 but with the actuator pins refracted.
Figure 4:
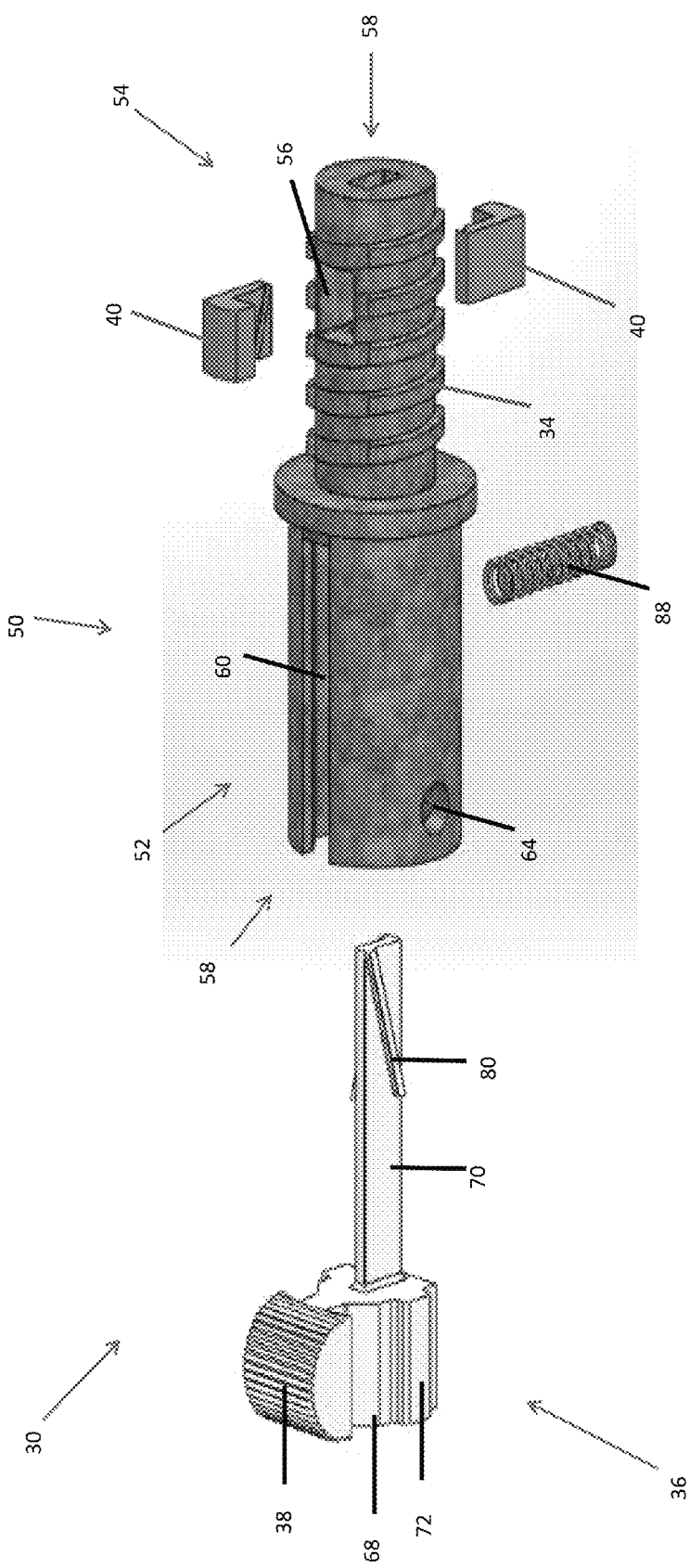
FIG. 4 is an assembly drawing of a quick fit adjustment mechanism.

Within the opening 32, the accessory 14 may have different non-thread designs. In one embodiment, there are apertures sized and positioned to receive the extended actuator pins 40 (as shown in FIG. 2). In another embodiment, there are no such apertures and the actuator pins 40 create enough force to create a frictional connection with the surface that defines the opening 32. Other designs are possible and would work well with this invention. In one embodiment, undesirable wobbling/vibrating is minimized by controlling relative size tolerances. In one specific embodiment, the size tolerances are held to about plus or minus 0.002 inches.

Figure 17:
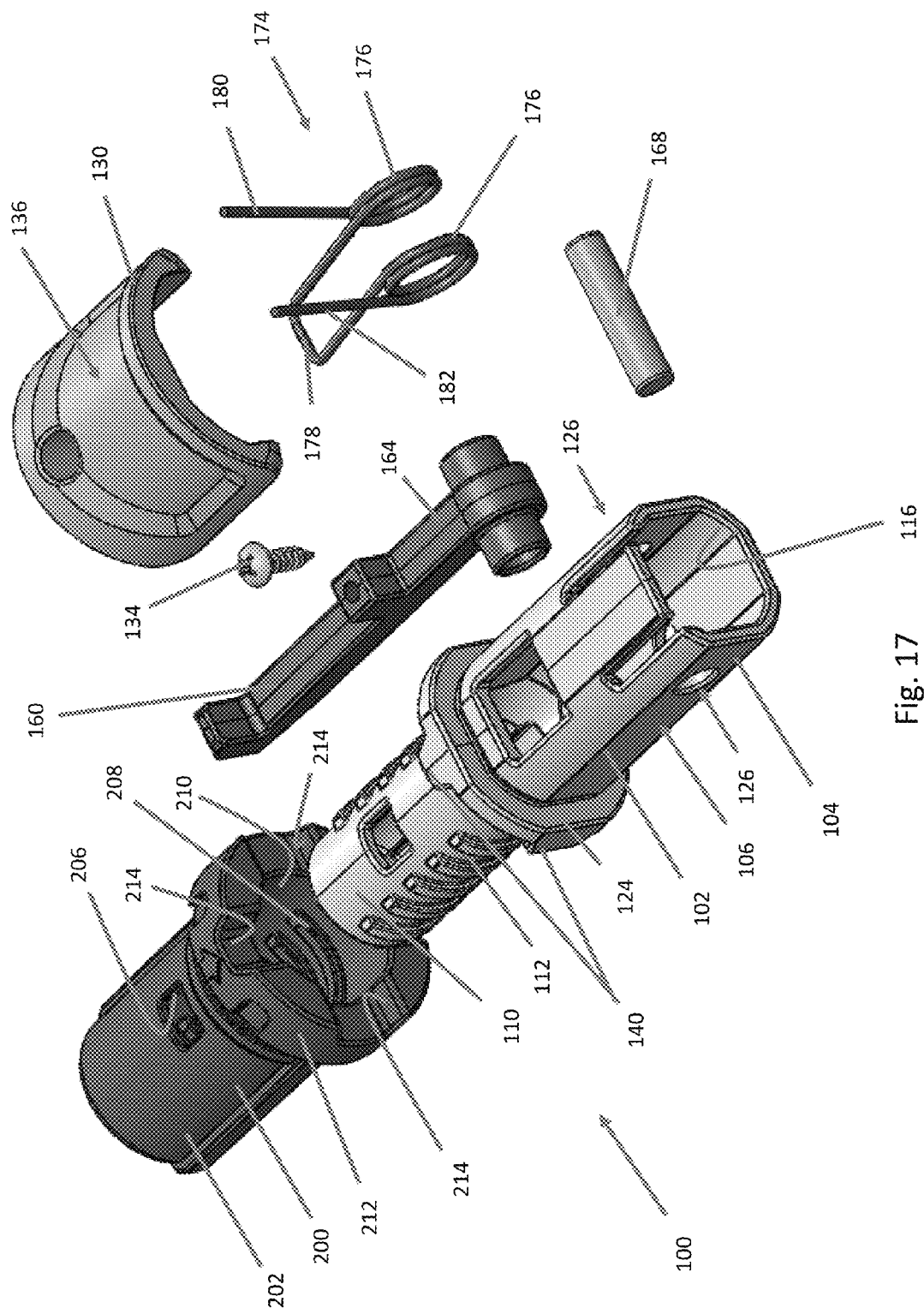
FIG. 17 is perspective assembly view of the components used in a quick fit adjustment mechanism according to some embodiments of this invention.
Figure 18:
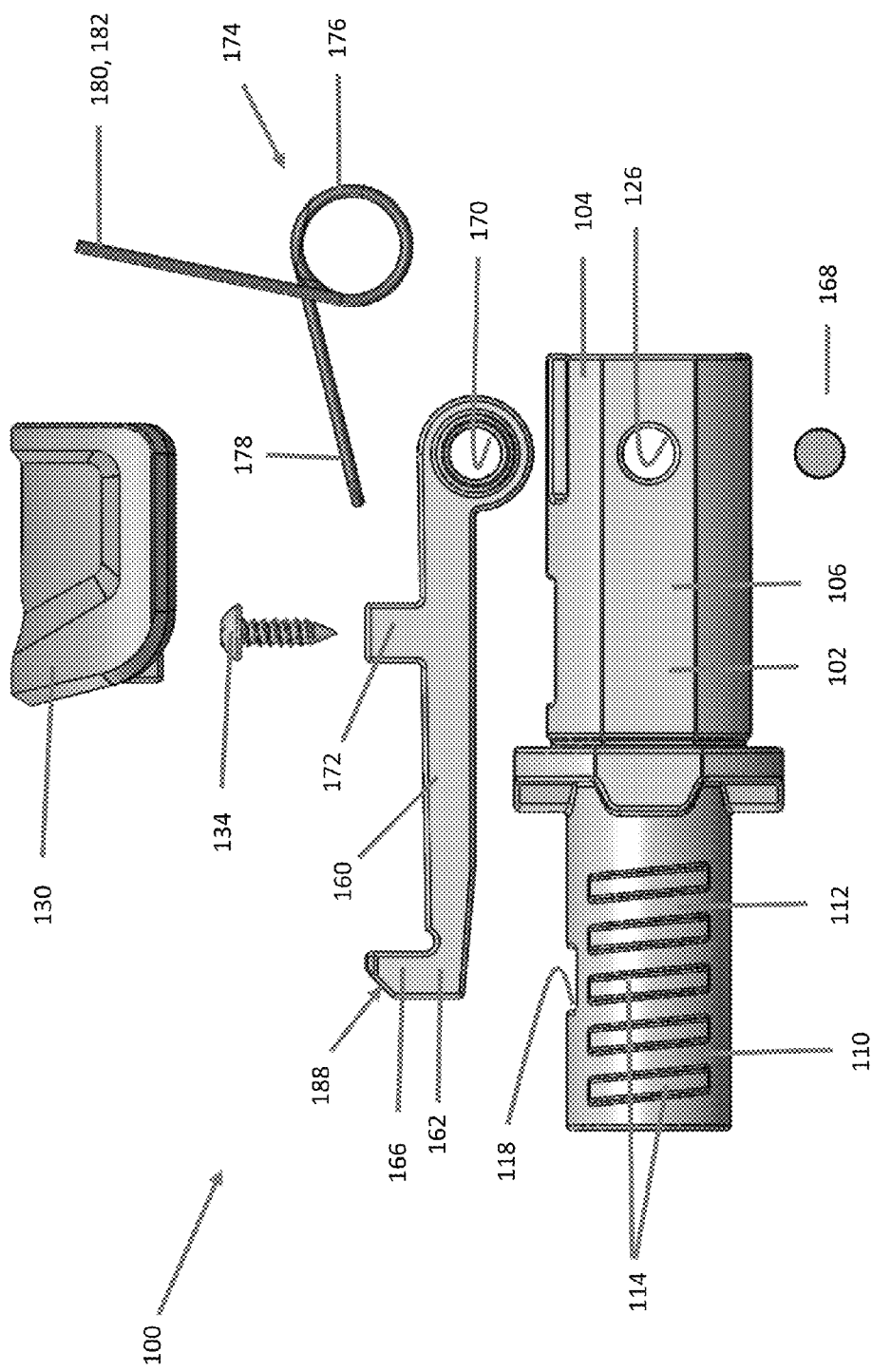
FIG. 18 is a side assembly view of the components shown in FIG. 17 except with the insert removed.
Figure 19:
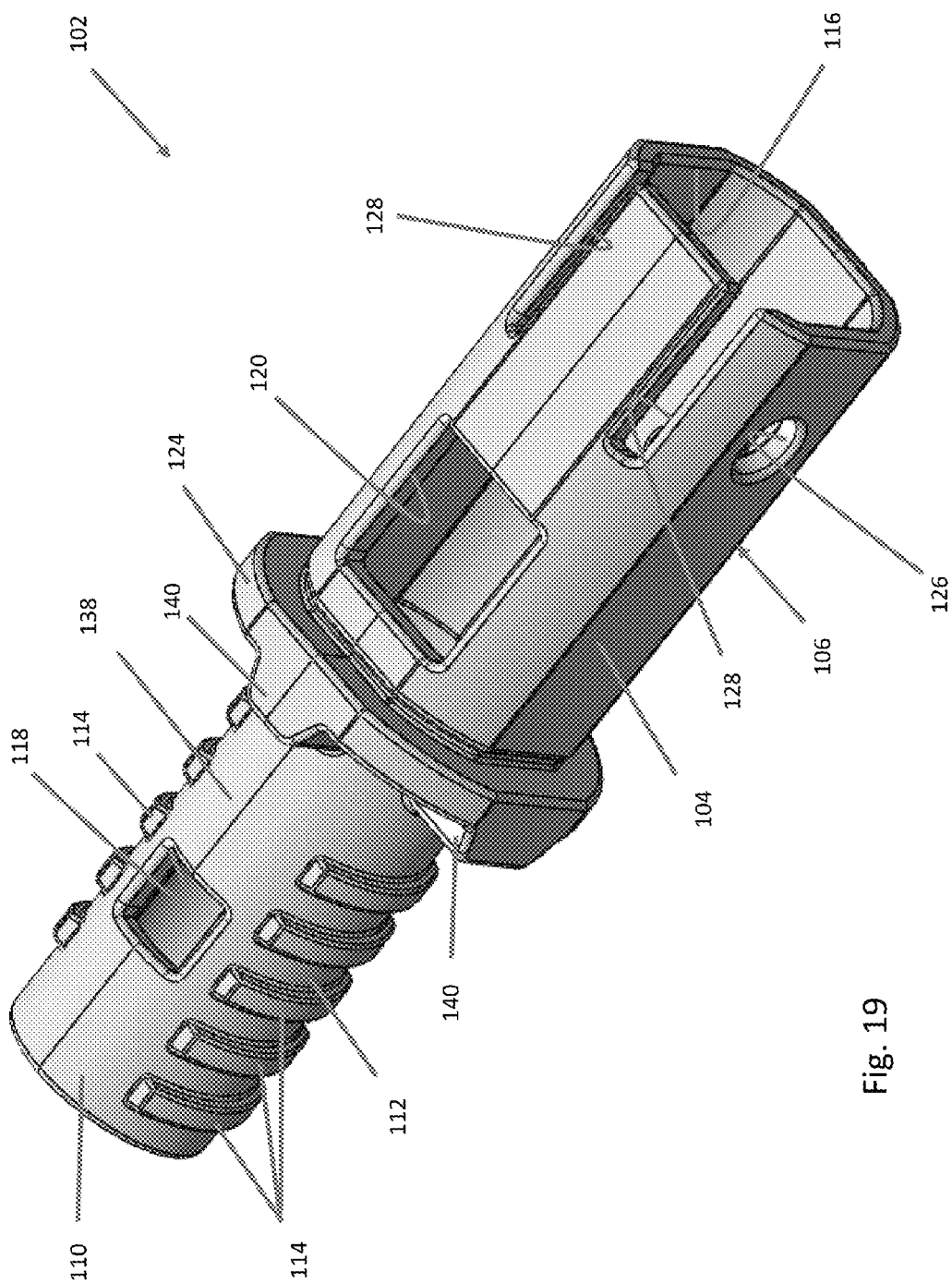
FIG. 19 is a top perspective view of a housing according so some embodiments of this invention.
Figure 20:
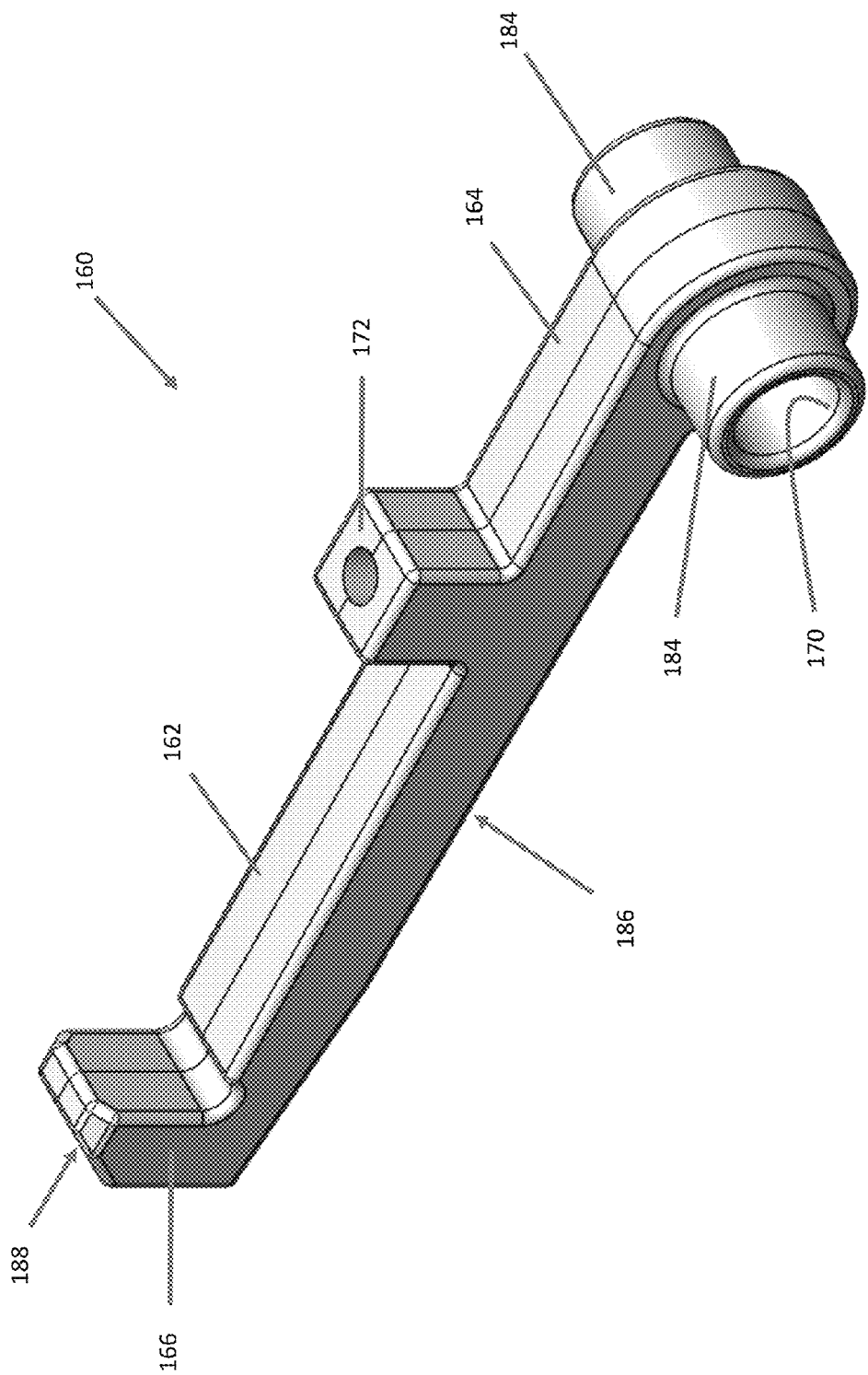
FIG. 20 is a top perspective view of a lever according to some embodiments of this invention.
Figure 26:
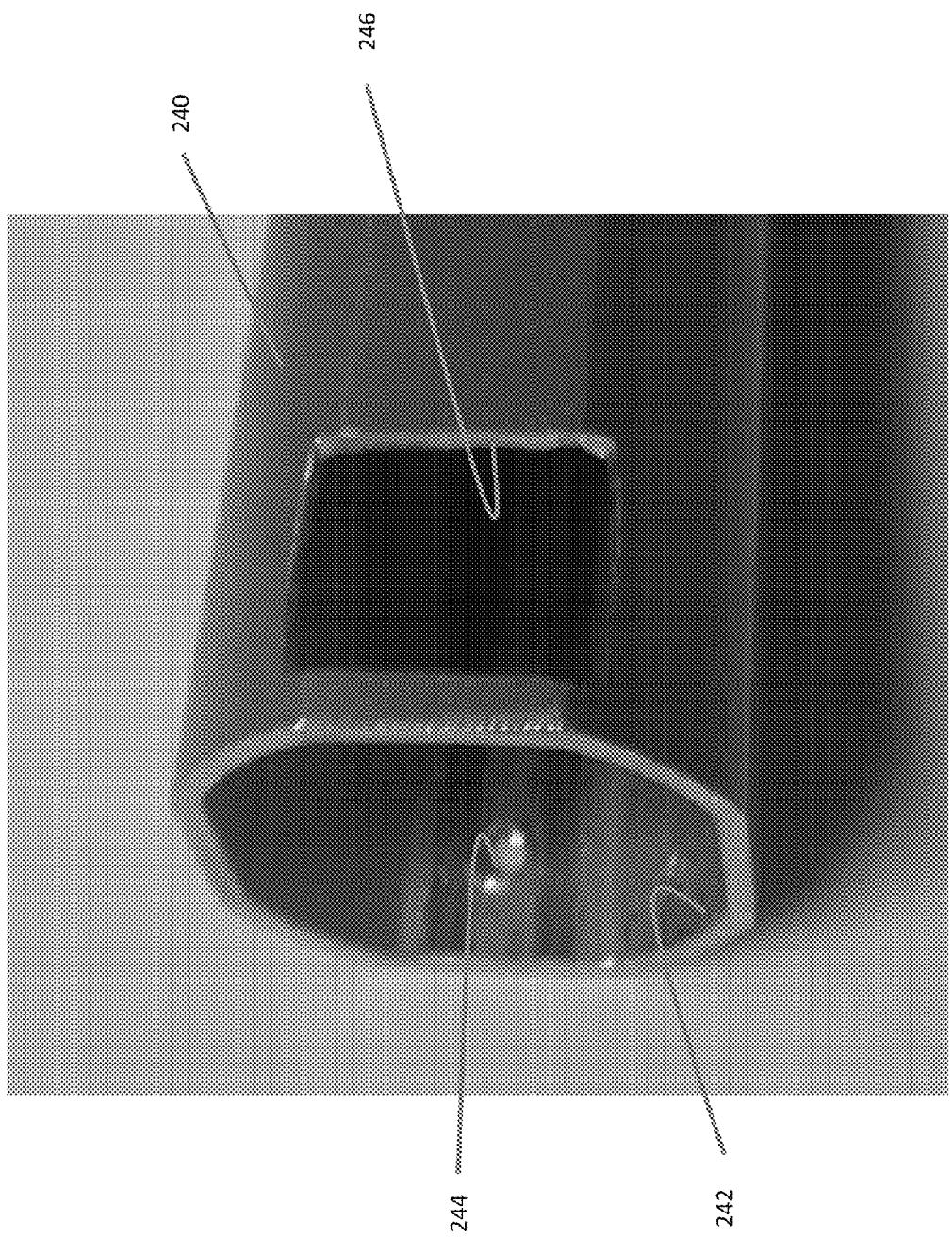
FIG. 26 is a top perspective view of the end of a pole that may be used with some embodiments of this invention.

With reference now to FIGS. 17-18, another embodiment quick fit adjustment mechanism 100 will now be described. The quick fit adjustment mechanism 100 may include a housing 102, a lever 160 and, in some embodiments, an insert 200. Embodiments of the quick fit adjustment mechanism 100 may be used with any pole chosen with the sound judgment of a person of skill in the art. As one non-limiting example, FIG. 26 shows the end of a pole 240 that may be used with the quick fit adjustment mechanism 100. The pole 240 may have a pole opening 242, a pole hole 244 that communicates the pole opening 242 to the outer surface of the pole 240 and a pole cavity 246 that communicates the pole opening 242 to the outer surface of the pole 240.

Figure 21:
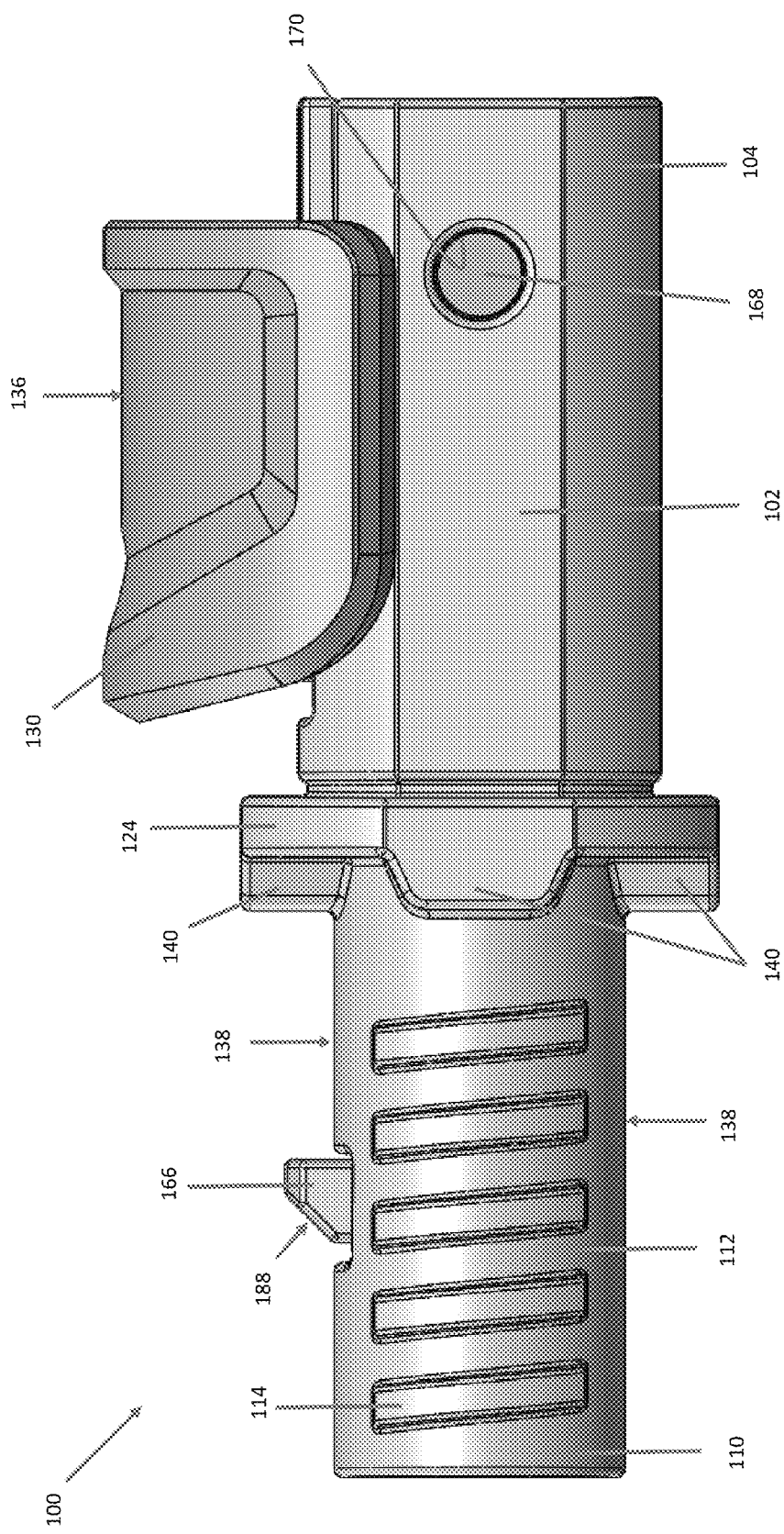
FIG. 21 is a side view showing the lever positioned within the housing.

With reference to FIGS. 17-18 and 26, the housing 102 may have a first end 104 that may be generally cylindrical in shape, as shown, and may have an attachment surface 106 that is suitable to be attached to a pole, such as pole 12 discussed above or pole 240. In one specific embodiment, the first end 104, and thus attachment surface 106, may be inserted within pole opening 242, shown in FIG. 26. A connector may then be inserted through pole hole 244 and an opening 108 (referenced in FIG. 22) in the housing 102 to secure the housing 102 to the pole. The housing 102 may have a second end 110 that may be generally cylindrical in shape, as shown, and may have an outer surface 112. The second end 110, and thus outer surface 112, may be inserted into an opening in an accessory, such as opening 32 described above, or into the insert 200 as is discussed further below. In one embodiment, shown, threads 114 may formed on the outer surface 112 and may be used to engage threads in the accessory opening. In one embodiment, shown, there are two areas of housing threads 114 that extend axially on the sides of the housing 102 and two areas of smooth surfaces 138 (and thus no threads), see also FIG. 21, that extend axially on the top and bottom of the housing 102.

With reference now to FIGS. 17-19 and 22, a housing chamber 116 may be formed within the housing 102 and may extend from the first end 104 to the second end 110, as shown. In one embodiment, shown, the housing chamber 116 extends all the way through the first end 104 but does not extend through the second end 110 but instead is closed with end wall 122, as referenced in FIG. 22. The housing 102 may have a housing hole 118 that communicates the housing chamber 116 to the outer surface 112 of the second end 112 of the housing 102. The housing 102 may have a housing cavity 120 that communicates the housing chamber 116 to the outer surface of the first end 104 of the housing 102. The housing 102 may have a housing flange 124 that extends outward from the outer surface of the housing 102. For the embodiment shown, the housing flange 124 is positioned axially between the first and second ends 104, 110.

With reference now to FIGS. 17-18 and 20-22, the lever 160 may have first and second ends 162, 164. The first end 162 may define an actuator pin 166 to be used as will be discussed below. The lever 160 may be positioned at least partially within the housing chamber 116 and may be pivotal with respect to the housing 102. When positioned within the housing chamber 116, the actuator pin 166 may be positioned juxtaposed to the housing hole 118, as is shown, for example, in FIG. 23. In one embodiment, shown, the lever 160 pivots with respect to the housing 102 about the second end 164 of the lever 160. While the lever 160 may have any pivotal connection with the housing 102 chosen with the sound judgment of a person of skill in the art, for the embodiment shown the lever 160 may pivot about a pivot pin 168. The pivot pin 168 may be received within a pivot pin opening 170 formed in the lever 160 and a pair of pivot pin openings 126, 126 formed on opposite sides of the housing 102 (see also FIG. 19). The lever 160 may have an operator engagement surface 172 that extends upward (in the drawings shown) and that is used as will be discussed below. The operator engagement surface 172 may be accessed through the housing cavity 120 (see FIGS. 19 and 22) and through the pole cavity 246 which may be aligned with housing cavity 120. For the embodiment shown, the operator engagement surface 172 is positioned between the first and second ends 162, 164 of the lever 160.

With reference now to FIGS. 17-20, in one embodiment a biasing device 174 may be used to bias the actuator pin 166 toward a particular position, as will be discussed below. In one specific embodiment, shown, the biasing device 174 may be a spring. The spring 174 may have a pair of coils 176, 176 connected together by a mid-section 178. The mid-section 178 may extend away from the coils 176, 176 as shown. Opposite ends 180, 182 of the spring 174 may extend away from the coils 176, 176 as shown. To attach the spring 174 to the quick fit adjustment mechanism 100, the lever 160 may have a pair of spring reception surfaces 184, 184 on opposite sides of the lever 160. The reception surfaces 184, 184 may be cylindrically shaped, as shown, and may extend from opposite sides of the lever 160 and define opposite ends of the pivot pin opening 170. The spring coils 176, 176 may be received on the spring reception surfaces 184, 184 and the spring mid-section 178 may contact a spring contact surface 186, also labeled in FIG. 22, of the lever 160. The ends 180, 182 of the spring may be received in respective spring slots 128, 128, referenced in FIG. 19, formed in the first end 104 of the housing 102. When the quick fit adjustment mechanism 100 is attached to a pole, the spring ends 180, 182 are positioned against an inner surface of the pole, such as against the inner surface of pole 240, shown in FIG. 26, which defines pole opening 242. This positioning causes the mid-section 178 of the spring to apply a force to the spring contact surface 186 of the lever 160. This force urges the first end 162 of the lever upward (direction 216 in FIG. 22) and thus urges or biases the actuator pin 166 toward the housing hole 118.

With reference now to FIGS. 17-18 and 21-23, an operator button 130 may be used to simplify use of the quick fit adjustment mechanism 100. The operator button 130 may have a connection surface 132 that is connected to the operator engagement surface 172 of the lever 160. In a specific embodiment, the connection surface 132 forms a channel that receives the operator engagement surface 172, as shown. A connector 134 may then be inserted through a connector hole formed in the operator button 130 and received in a connector hole formed in the lever 160 to connect the operator button 130 to the lever 160. The connection surface 132 may extend through the housing cavity 120, as shown, and through the pole cavity 246, shown in FIG. 26. The operator button 130 may have an operator contact surface 136 that is contacted by an operator to manually operate the quick fit adjustment mechanism 100, as will be discussed further below. For the embodiment shown, the operator contact surface 136 may be curved, as seen best in FIG. 17.

Figure 22:
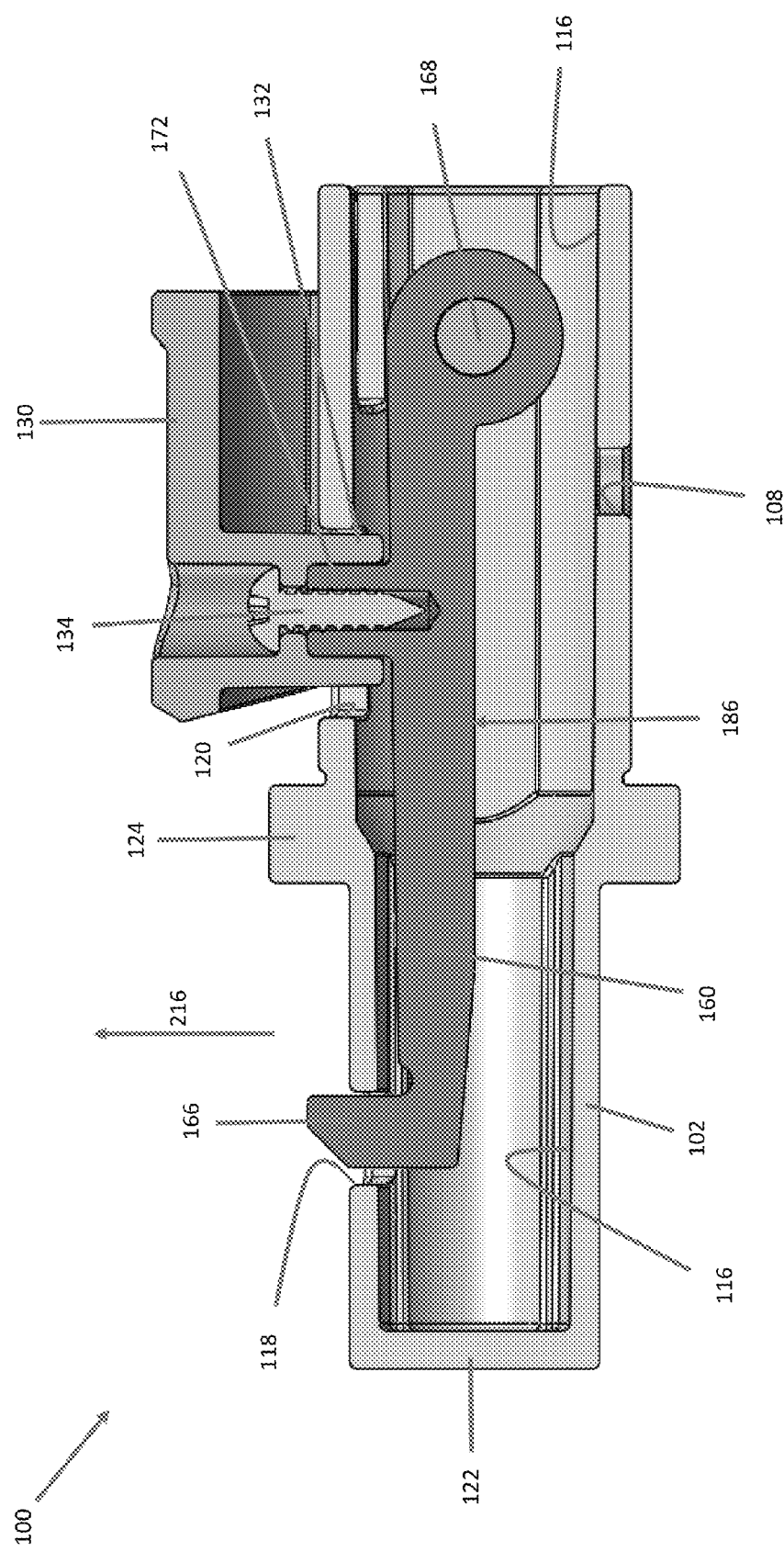
FIG. 22 is a side section view of the lever and housing of FIG. 21 except with the spring removed for clarity.
Figure 23:
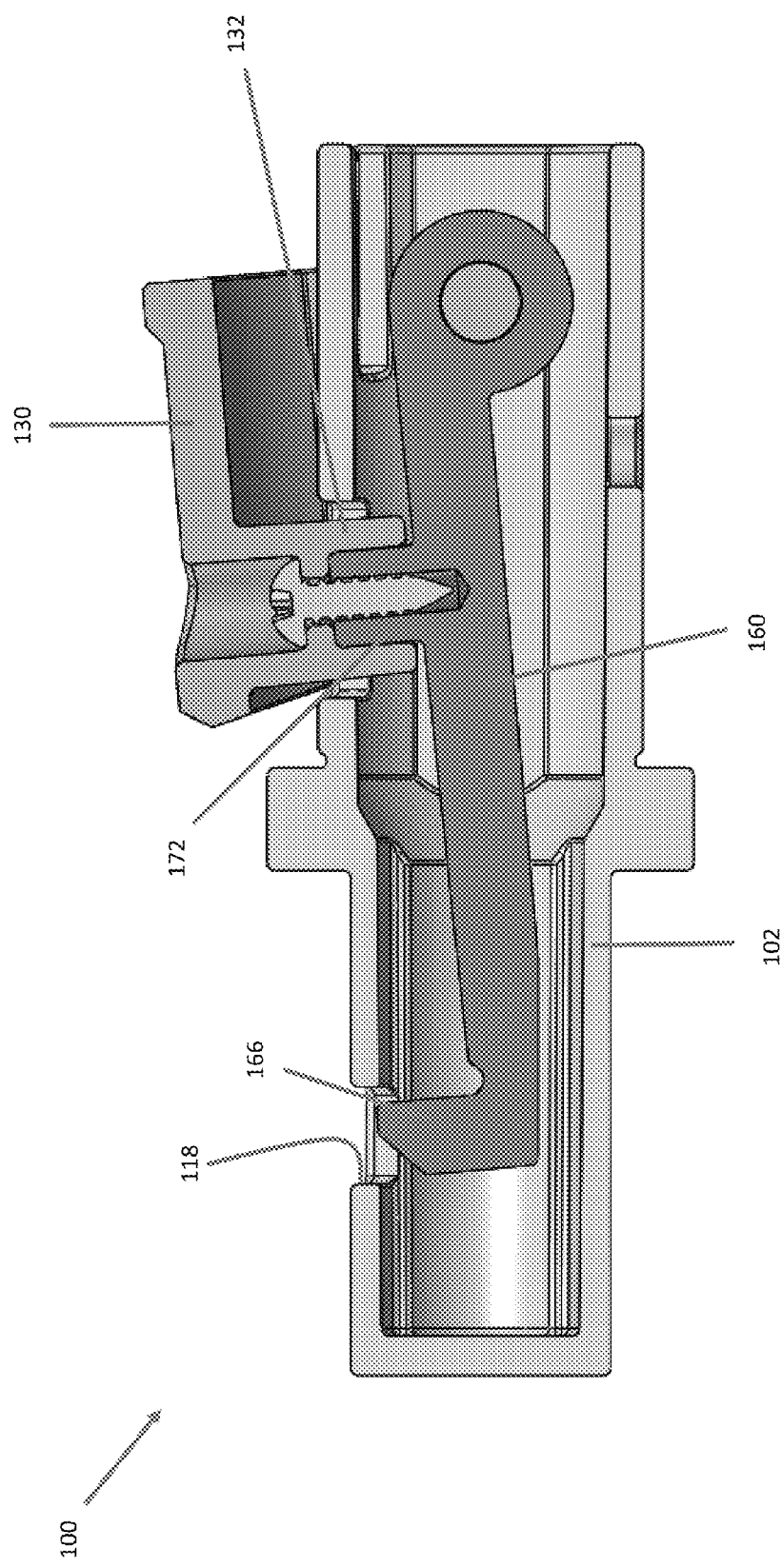
FIG. 23 is a view similar to that shown in FIG. 22 but with the lever in the retracted position.

With reference now to FIGS. 17-23, once the quick fit adjustment mechanism 100 is attached to the pole as described above, it may be used as will now be explained. The quick fit adjustment mechanism 100 is selectively manually adjustable. The quick fit adjustment mechanism 100 may be in a first condition where the actuator pin 166 is in a retracted position with respect to the housing hole 118. By "retracted position" it is meant that the actuator pin 166 does not extend fully through the housing hole 118. The retracted position is shown in FIG. 23. If a biasing device 174 is used, it may bias the lever 160 and thus the actuator pin 166 into an extended position. The extended position is shown in FIG. 22. Thus, the operator may, in one embodiment, simply apply a force to the operator engagement surface 172, such as, in one embodiment, by pressing on the operator contact surface 136 of the operator button 130, to overcome the biasing force of the biasing device 174 to adjust the actuator pin 166 into the retracted position. In another embodiment, the operator need only insert the housing 102 and during the insertion the actuator pin 166 may contact the accessory and be forced downward. In one specific embodiment, the actuator pin 166 may have an angled surface 188 that contacts the accessory during insertion to better apply the force necessary to move the actuator pin 166 into the retracted position. With the actuator pin 166 in the retracted position, the second end 110 of the housing 102 can easily be removed from any accessory opening and easily inserted into any accessory opening. When in the retracted position, for example, the housing 102 can be removed from a first paint accessory opening and inserted into a second paint accessory opening. The housing flange 124, if used, may be used to contact the accessory as the housing 102 is inserted into the accessory opening to limit the distance the housing can be inserted. Once inserted into the desired accessory opening, the lever 160, and thus the quick fit adjustment mechanism 100, may be manually adjusted into a second condition where the actuator pin 166 is in an extended position where the actuator pin 166 extends from the housing chamber 116 out of the housing hole 118 (see FIG. 22) and into engagement with the accessory. If a biasing device 174 is used, the operator only needs to release the operator engagement surface 172 of the lever 160, such as be releasing the operator button 130, so that the biasing device 174 applies a force to the lever 160 to cause the actuator pin 166 to move into the extended position. The adjustments just described can be repeated as necessary to secure the housing 102, and thus the pole, to numerous accessories as desired. All that is required is that the second end 110 of the housing 102 can be received within an opening in the accessory. As noted above, in embodiments where the accessory has threads, the threads 114 formed on the outer surface 112 may engage the accessory threads to secure the housing 102 and thus the pole to the accessory.

Figure 24:
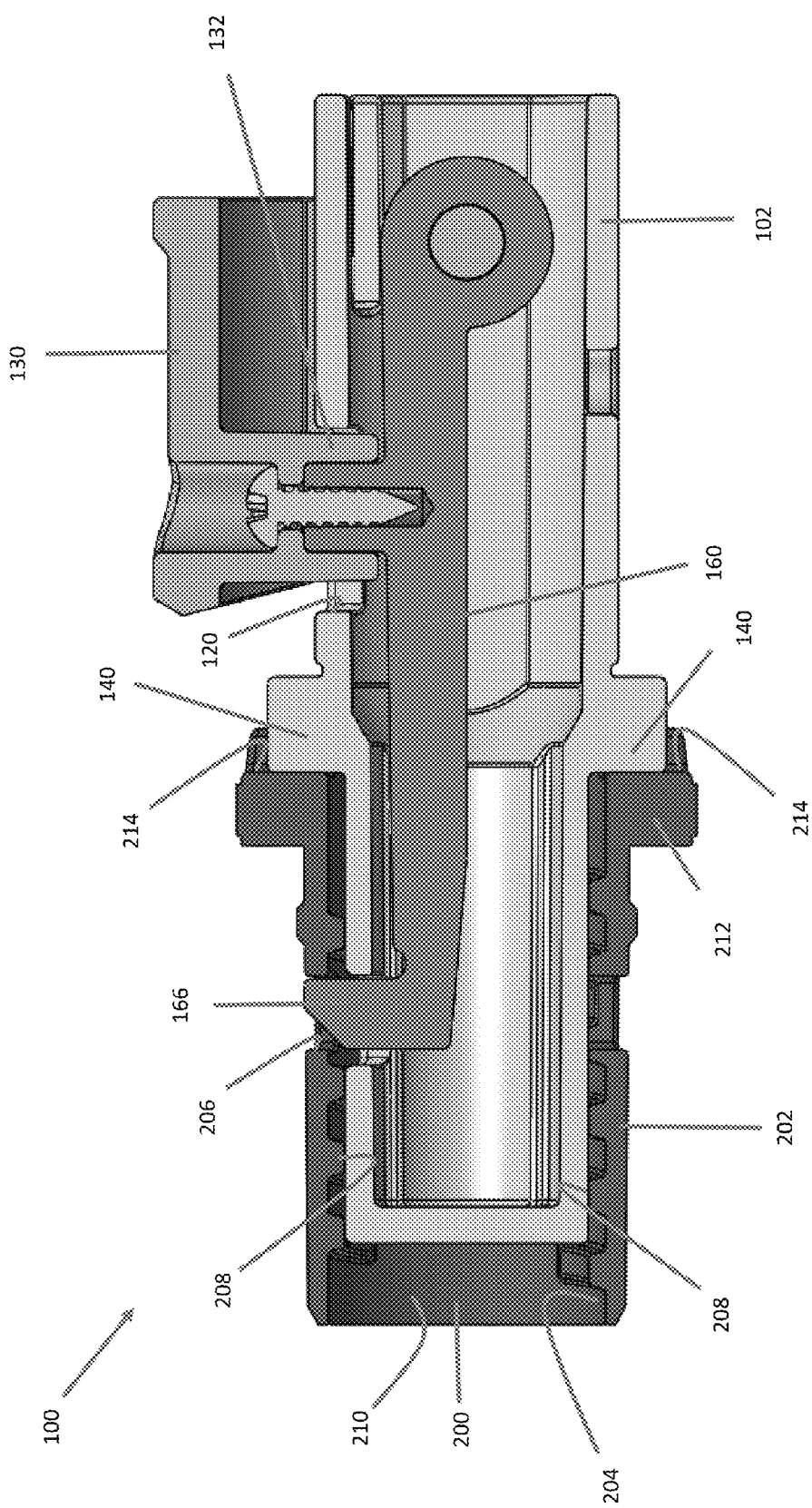
FIG. 24 is a view similar to that shown in FIG. 22 but with an insert included.
Figure 25:
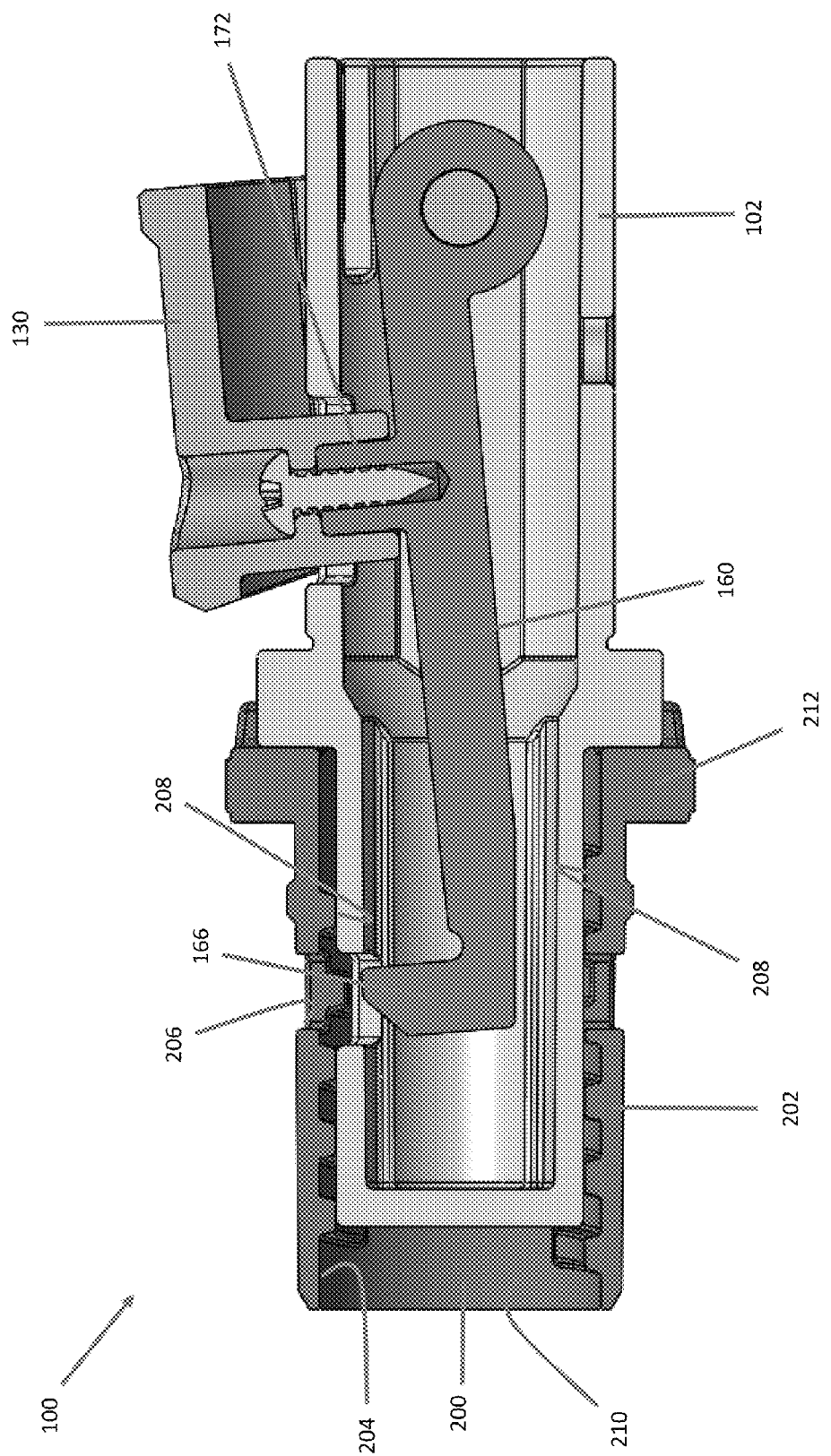
FIG. 25 is a view similar to that shown in FIG. 24 but with the lever in the retracted position.

With reference now to FIGS. 17 and 24-25, in one embodiment the quick fit adjustment mechanism 100 may include an insert 200. The insert 200 may have an insert body 202 and an insert chamber 204 that extends into the insert body 202. The insert body 202 may be cylindrically shaped, as shown. The insert body 202 may have an insert hole 206 that communicates with the insert chamber 204. In one embodiment, shown, the insert hole 206 may communicate the insert chamber 204 to an outer surface of the insert body 202. In one embodiment, the insert 200 may have at least one insert rib 208 formed on an inner surface of the insert body 202. In one specific embodiment, there are two areas of multiple insert ribs 208 that extend axially on the top and bottom of the insert 200 and two areas of smooth surfaces 210 (and thus no ribs) that extend axially on the sides of the insert 200. The insert 200 may have a have an insert flange 212 that extends outward from the outer surface of the insert body 202. For the embodiment shown, the insert flange 212 is positioned at an axial end of the insert body 202.

With continuing reference to FIGS. 17 and 24-25, when the insert 200 is used, the insert body 202 is inserted within an accessory opening. The insert body 202 may form a press fit with the accessory to secure the insert body 202 to the accessory. In other embodiments, the insert body 202 may be secured to the accessory using an adhesive or other methods chosen with the sound judgment of a person of skill in the art. As the insert body 202 is being inserted into the accessory opening, the insert flange 212 may be used to contact the accessory to limit the distance the insert can be inserted.

Still referring to FIGS. 17 and 24-25, when the insert 200 has been attached to the accessory, the use of the quick fit adjustment mechanism 100 is similar to that discussed above. The actuator pin 166 may be in, or adjusted into, a retracted position as discussed above and shown in FIG. 25. The second end 110 of the housing 102 can then be inserted into the insert chamber 204. The housing flange 124, if used, may be used to contact the insert flange 212, if used, as the housing 102 is inserted into the insert chamber 204.

With reference now to FIGS. 17-19, 21 and 24-25, in order to assure proper relative angular alignment between the housing 102 and the insert 200, the housing threads 114 and the insert rib(s) 208 may be arranged to interfere with each other to limit the relative angular positions that the second end 110 of the housing 102 can be inserted into the insert chamber 204. While this arrangement can be any chosen with the sound judgment of a person of skill in the art, for the embodiment shown, the housing threads 114 are formed on the sides of the housing 102 and the insert ribs 208 are formed on the top and bottom of the insert 200. With this alignment, there is no interference between the housing threads 114 and the insert ribs 208 so the housing 102 can be easily inserted into the insert 200 with proper relative angular alignment. If, however, the housing 102 is attempted to be inserted into the insert 200 without proper relative alignment, the housing threads 114 will contact the insert ribs 208 and this contact (an interference) will prevent continued insertion of the housing 102 until the proper relative angular alignment is achieved. Proper relative angular alignment can be easily obtained by rotating the housing 102 with respect to the insert 200 until the housing threads 114 are juxtaposed to the smooth surfaces 210 of the insert 200 and the insert ribs 208 are juxtaposed to the smooth surfaces 138 of the housing 102. At this point, the housing 102 can be easily inserted into the insert 200 as discussed above.

With reference now to FIGS. 17, 19, 21 and 24, in order to prevent relative rotation of the housing 102 and the insert 200 after the housing 102 has been inserted into the insert 200, a convex feature 140 in one component may be received in a concave feature 214 in the other. For the embodiment shown, four convex features 140 are positioned on opposite sides and on the top and bottom of the housing flange 124 and matching concave features 214 are positioned similarly on the insert flange 212. It is also contemplated to position one or more convex features on the insert 200 to be received in matching concave features on the housing 102.

With reference now to FIGS. 24-25, once the housing 102 is inserted into the insert 200, the lever 160, and thus the quick fit adjustment mechanism 100, may be manually adjusted into the extended position where the actuator pin 166 extends from the housing chamber 116 out of the housing hole 118 and into engagement with the insert hole 206, as shown in FIG. 24. If a biasing device 174 is used, see FIG. 17, the operator only needs to release the operator engagement surface 172 of the lever 160, such as be releasing the operator button 130, so that the biasing device 174 applies a force to the lever 160 to cause the actuator pin 166 to move into the extended position. The adjustments just described can be repeated as necessary to secure the housing 102, and thus the pole, to accessories having an insert 200 as desired.

The components of the quick fit adjustment mechanisms 30, 100 can be made in sizes and of materials chosen with the sound judgment of a person of skill in the art. In one embodiment, the distal end of pole 12 is made with a Zinc die cast body. In another embodiment, the operator buttons 38, 130 and actuator pins 40, 166 are made from high impact nylon. In yet another embodiment, the sleeve 44 is made of a clear silicone rubber.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

We claim:

1. A quick fit adjustment mechanism comprising:
    a housing comprising: (1) a first end that has a surface that is suitable to be attached to an associated pole; (2) a second end that has an outer surface with threads that are engageable with threads formed on a surface defining a first accessory opening in a first associated accessory to secure the first associated accessory to the associated pole; (3) a housing chamber formed within the housing and extending from the first end to the second end; and, (4) a housing hole that communicates the housing chamber to the outer surface of the second end of the housing;
    a lever that: (1) is positioned at least partially within the housing chamber; (2) has a first end defining an actuator pin that is positioned juxtaposed to the housing hole; (3) comprises an operator engagement surface; and, (4) is pivotal with respect to the housing; and,
    wherein the quick fit adjustment mechanism is adjustable by selective manual engagement with the operator engagement surface to pivot the lever with respect to the housing between: (1) a first condition where the actuator pin is in a retracted position with respect to the housing hole and the second end of the housing is: (a) removable from the first accessory opening; and, (b) insertable within a second accessory opening in a second associated accessory; and, (2) a second condition where, while the second end of the housing is inserted within the second accessory opening, the actuator pin is in an extended position where the actuator pin extends from the housing chamber out of the housing hole and into engagement with the second associated accessory to secure the second associated accessory to the associated pole.

2. The quick fit adjustment mechanism of claim 1 further comprising:
    an insert comprising: (1) an insert body, wherein at least a portion of the insert body is positioned within the second accessory opening; (2) an insert chamber that extends into the insert body; and, (3) an insert hole that communicates with the insert chamber; and,
    wherein in the second condition the second end of the housing is inserted within the insert chamber and the actuator pin extends from the housing chamber out of the housing hole and into the insert hole.

3. The quick fit adjustment mechanism of claim 2 wherein the insert comprises:
    at least one insert rib formed on an inner surface of the insert body that interferes with the threads on the outer surface of the second end of the housing to limit the relative angular positions that the second end of the housing can be inserted into the insert chamber.

4. The quick fit adjustment mechanism of claim 2 wherein:
    one of the housing and the insert body comprises a convex feature;
    the other of the housing and the insert body comprises a concave feature; and, when the convex feature is received within the concave feature the housing cannot be rotated with respect to the insert body.

5. The quick fit adjustment mechanism of claim 4 wherein:
the insert body comprises an insert flange;
the housing comprises a housing flange that contacts the insert flange to limit the distance the second end of the housing can be inserted within the insert chamber;
the convex feature is formed on one of the insert flange and the housing flange; and,
the concave feature is formed on the other of the insert flange and the housing flange.

6. The quick fit adjustment mechanism of claim 1 further comprising:
a biasing device that biases the actuator pin into the extended position.

7. The quick fit adjustment mechanism of claim 1 wherein:
the housing comprises a housing cavity that communicates the housing chamber to an outer surface of the first end of the housing;
the lever has a second end that is pivotally attached to the housing; and,
the operator engagement surface of the lever is accessed through the housing cavity.

8. The quick fit adjustment mechanism of claim 7 further comprising:
an operator button comprising: (1) a connection surface that is connected to the operator engagement surface of the lever; and, (2) an operator contact surface that is contacted by an operator to manually engage the operator engagement surface.

9. A paint assembly comprising:
a pole;
a paint accessory comprising: an accessory opening;
a quick fit adjustment mechanism comprising:
an insert comprising: (1) an insert body, wherein at least a portion of the insert body is positioned within the accessory opening to attach the insert to the paint accessory; (2) an insert chamber that extends into the insert body; and, (3) an insert hole that communicates with the insert chamber;
a housing comprising: (1) a first end that has a surface that is attached to the pole; (2) a second end; (3) a housing chamber formed within the housing and extending from the first end to the second end; and, (4) a housing hole that communicates the housing chamber to the outer surface of the second end of the housing;
a lever that: (1) is positioned at least partially within the housing chamber; (2) has a first end defining an actuator pin that is positioned juxtaposed to the housing hole; (3) comprises an operator engagement surface; and, (4) is pivotal with respect to the housing;
wherein the lever is adjustable by selective manual engagement with the operator engagement surface to pivot the lever with respect to the housing between: (1) a first condition where the actuator pin is in a retracted position with respect to the housing hole and the second end of the housing is insertable into the insert chamber and thus into the accessory opening; and, (2) a second condition where, while the second end of the housing is inserted within the insert chamber, the actuator pin extends from the chamber out of the housing hole and into the insert hole to secure the paint accessory to the pole.

10. The paint assembly of claim 9 wherein:
one of the housing and the insert body comprises a convex feature;
the other of the housing and the insert body comprises a concave feature; and,
when the convex feature is received within the concave feature the housing cannot be rotated with respect to the insert body.

11. The paint assembly of claim 10 wherein:
the insert body comprises an insert flange;
the housing comprises a housing flange that contacts the insert flange to limit the distance the second end of the housing can be inserted within the insert chamber;
the convex feature is formed on one of the insert flange and the housing flange; and,
the concave feature is formed on the other of the insert flange and the housing flange.

12. The paint assembly of claim 9 further comprising:
a biasing device that biases the actuator pin into the extended position.

13. The paint assembly of claim 12 wherein:
the housing comprises a housing cavity that communicates the housing chamber to an outer surface of the first end of the housing;
the lever has a second end that is pivotally attached to the housing; and,
the operator engagement surface of the lever is accessed through the housing cavity.

14. The paint assembly of claim 13 further comprising:
an operator button comprising: (1) a connection surface that is connected to the operator engagement surface of the lever; and, (2) an operator contact surface that is contacted by an operator to manually engage the operator engagement surface.

15. A method comprising the steps of:
(A) providing a pole;
(B) providing a first paint accessory comprising: a first accessory opening;
(C) providing a quick fit adjustment mechanism comprising:
a housing comprising: (1) a first end that is attached to an end of the pole; (2) a second end that is sized to be received in the first accessory opening; (3) a housing chamber formed within the housing and extending from the first end to the second end; and, (4) a housing hole that communicates the housing chamber to the outer surface of the second end of the housing; and,
a lever that: (1) is positioned at least partially within the housing chamber; (2) has a first end defining an actuator pin that is positioned juxtaposed to the housing hole; (3) comprises an operator engagement surface; and, (4) is pivotal with respect to the housing; and,
(D) attaching the quick fit adjustment mechanism, and thus the pole, to the first paint accessory by: (1) manually engaging the operator engagement surface of the lever to pivot the lever with respect to the housing to cause the actuator pin to move into a retracted position with respect to the housing hole; (2) inserting the second end of the housing into the first accessory opening; and, (3) manually engaging the operator engagement surface of the lever to pivot the lever with respect to the housing to cause the actuator pin to move into an extended position where the actuator pin extends through the housing hole and into engagement with the first accessory to secure the first paint accessory to the housing and thus to the pole.

16. The method of claim 15 wherein:
step (C) comprises the step of: providing the quick fit adjustment mechanism with a biasing device that applies a biasing force to the lever to cause the actuator pin to move into the extended position;

step (D)(1) comprises the step of: applying a manual force to the operator engagement surface of the lever to overcome the biasing force; and, step (D)(2) comprises the step of: removing the manual force from the operator engagement surface of the lever.

17. The method of claim 15 wherein:

the method further comprises the step of: providing a second paint accessory comprising: a second accessory opening formed by a surface having threads;

step (C) comprises the step of: providing the second end of the housing to: (1) be sized to be received in the second accessory opening; and, (2) have an outer surface with threads;

the method further comprises the step of: (D) attaching the quick fit adjustment mechanism, and thus the pole, to the second paint accessory by: (1) manually engaging the operator engagement surface of the lever to pivot the lever with respect to the housing to cause the actuator pin to move into a retracted position with respect to the housing hole; (2) inserting the second end of the housing into the second accessory opening by rotating the housing with respect to the second paint accessory with the threads of the housing engaging the threads of the second accessory; and, (3) manually engaging the operator engagement surface of the lever to pivot the lever with respect to the housing to cause the actuator pin to move into an extended position where the actuator pin extends through the housing hole and into engagement with the second accessory.

18. The method of claim 15 wherein:

step (C) comprises the step of: providing an insert comprising: (1) an insert body, wherein at least a portion of the insert body is positioned within the first accessory opening to attach the insert to the first paint accessory; (2) an insert chamber that extends into the insert body; and, (3) an insert hole that communicates with the insert chamber;

step (D)(2) comprises the step of: inserting the second end of the housing into the insert chamber; and, step (D)(3) comprises the step of: extending the actuator pin into the insert hole.

19. The method of claim 18 wherein:

step (C) comprises the steps of: providing one of the housing and the insert body with a convex feature; and, providing the other of the housing and the insert body with a concave feature; and, step (D) comprises the step of: inserting the convex feature into the concave feature to prevent the housing from being rotated with respect to the insert.

20. The method of claim 18 wherein:

step (C) comprises the steps of: providing the insert with a flange; and, providing the housing with a flange; and, step (D)(2) comprises the step of: inserting the second end of the housing into the insert chamber until the flange of the housing contacts the flange of the insert to limit the distance the second end of the housing can be inserted within the insert chamber.

* * * * *